US011348293B2

(12) United States Patent
Schneider

(10) Patent No.: US 11,348,293 B2
(45) Date of Patent: *May 31, 2022

(54) DYNAMIC PRICE RANGE SYMBOL UPDATE AND DISPLAY SYSTEM, METHOD, AND DEVICE

(71) Applicant: Eric Schneider, Delray Beach, FL (US)

(72) Inventor: Eric Schneider, Delray Beach, FL (US)

(*) Notice: Subject to any disclaimer, the term of this patent is extended or adjusted under 35 U.S.C. 154(b) by 179 days.

This patent is subject to a terminal disclaimer.

(21) Appl. No.: 16/937,949

(22) Filed: Jul. 24, 2020

(65) Prior Publication Data

US 2021/0256744 A1    Aug. 19, 2021

Related U.S. Application Data

(63) Continuation-in-part of application No. 16/935,084, filed on Jul. 21, 2020, now Pat. No. 11,321,780, and
(Continued)

(51) Int. Cl.
*G06T 11/20*     (2006.01)
*G06F 16/26*     (2019.01)
*G06Q 40/06*     (2012.01)

(52) U.S. Cl.
CPC ............ *G06T 11/206* (2013.01); *G06F 16/26* (2019.01); *G06Q 40/06* (2013.01)

(58) Field of Classification Search
CPC ........ G06T 11/206; G06F 16/26; G06Q 40/06
See application file for complete search history.

(56) References Cited

U.S. PATENT DOCUMENTS 7,043,449 B1    5/2006  Li et al.
7,212,208 B2    5/2007  Khozai
(Continued)

FOREIGN PATENT DOCUMENTS

JP   2004-199629 A  *  7/2004  ............. G06F 17/60
KR   20090003418 A  *  1/2009  ............. G06Q 40/04

OTHER PUBLICATIONS

International Search Report dated Sep. 30, 2020 in International Application No. PCT/US2020/042622.
(Continued)

*Primary Examiner* — Ryan R Yang

(57) ABSTRACT

A computer implemented method for displaying to a user a candlestick representative of a price range of a market traded security during at least a portion of a time period having a plurality of intratime periods includes receiving a OHLC (open, high, low, close) data of a first intratime period and a OHLC data of a second intratime period, a charting engine generating a candle body from an open price of the first intratime period and a close price of the second intratime period, determining a highest intratime period having a highest price from each high price of each the intratime period and a lowest intratime period having a lowest price from each low price of each the intratime period, the charting engine generating at least one of an upper wick and lower wick, a bottom of the upper wick connected to a top of the candle body above the highest intratime period and a top of the lower wick connected to a bottom of the candle body below the lowest intratime period, and the charting engine displaying the candlestick including the candle body and the at least one of the upper wick and lower wick, where the candlestick visually depicts and enables the user to see proportional to a width of the candle body when the upper wick and the lower wick have occurred during the at least a portion of the time period.

25 Claims, 25 Drawing Sheets

Related U.S. Application Data a continuation-in-part of application No. 16/932,345, filed on Jul. 17, 2020, now Pat. No. 11,282,245, and a continuation-in-part of application No. 16/790,512, filed on Feb. 13, 2020, now Pat. No. 10,755,458.

(56) References Cited

U.S. PATENT DOCUMENTS

| | | | |
|---|---|---|---|
| 7,356,501 | B2 | 4/2008 | Churquina |
| 7,542,940 | B2 | 6/2009 | Burns et al. |
| 7,707,100 | B2 | 4/2010 | Hjartberg et al. |
| 7,844,487 | B2 | 11/2010 | Chapman |
| 7,882,002 | B2 | 2/2011 | Monroe et al. |
| 8,650,115 | B1 | 2/2014 | Seiden et al. |
| 8,661,358 | B2 | 2/2014 | Duncker et al. |
| 10,037,574 | B2 | 7/2018 | Decker et al. |
| 2004/0164983 | A1 | 8/2004 | Khozai |
| 2004/0267654 | A1 | 12/2004 | Peng et al. |
| 2007/0067233 | A1 | 3/2007 | Dalal |
| 2009/0192877 | A1* | 7/2009 | Chapman ............... G06Q 90/00 345/440 |
| 2011/0137822 | A1 | 6/2011 | Chapman |
| 2011/0320383 | A1* | 12/2011 | Chang ................. G06Q 40/06 705/36 R |
| 2012/0150716 | A1* | 6/2012 | Bark ..................... G06Q 40/06 705/37 |
| 2013/0066803 | A1 | 3/2013 | Worlikar |
| 2013/0080312 | A1 | 3/2013 | Kawamura |
| 2013/0080370 | A1 | 3/2013 | Zadeh |
| 2013/0187926 | A1 | 7/2013 | Silverstein et al. |
| 2013/0191267 | A1 | 7/2013 | Rooney |
| 2014/0143115 | A1 | 5/2014 | Kono |
| 2015/0066725 | A1 | 3/2015 | Cai |
| 2015/0154700 | A1 | 6/2015 | Hackett |
| 2015/0242997 | A1 | 8/2015 | Sun et al. |
| 2015/0244850 | A1 | 8/2015 | Rodriguez et al. |
| 2016/0104308 | A1* | 4/2016 | Allyn ..................... G06T 13/20 345/440 |
| 2016/0217526 | A1 | 7/2016 | Decker |
| 2016/0300303 | A1 | 10/2016 | Seiden et al. |
| 2017/0018032 | A1 | 1/2017 | Chen et al. |
| 2017/0301024 | A1 | 10/2017 | Dalal et al. |
| 2018/0189990 | A1 | 7/2018 | Cardno et al. |
| 2018/0315123 | A1 | 11/2018 | Cohen |

OTHER PUBLICATIONS

International Search Report dated Oct. 19, 2021 in International Application No. PCT/US2021/040780.

* cited by examiner

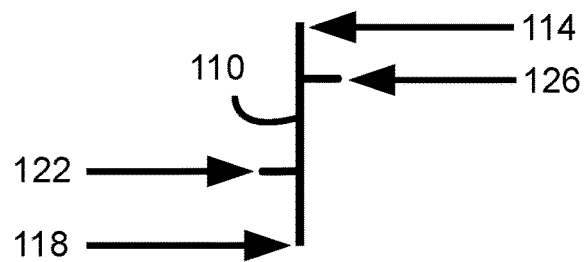
Prior Art
Fig. 1-A
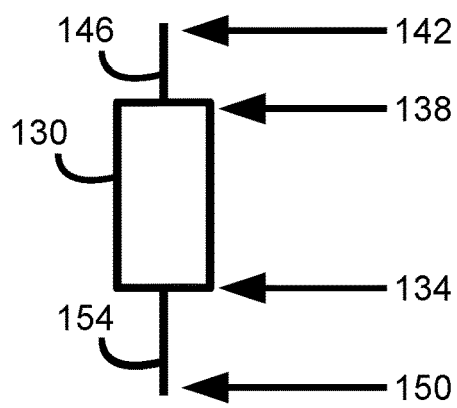 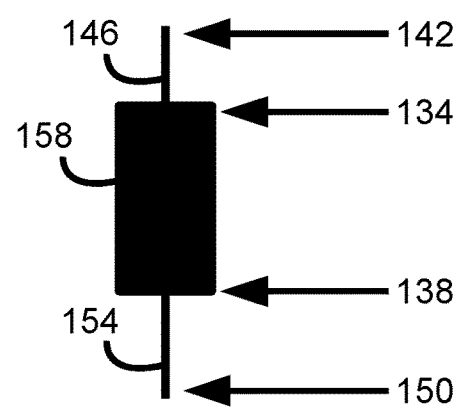
Prior Art
Fig. 1-B
Prior Art
Fig. 1-C
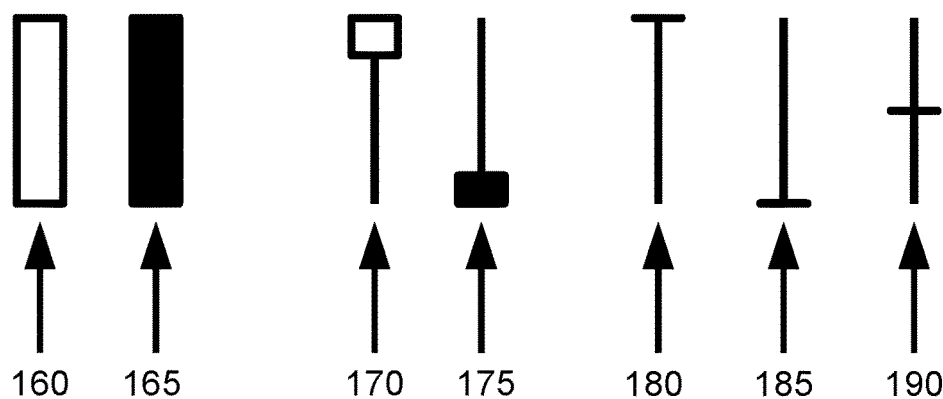
Prior Art
Fig. 1-D

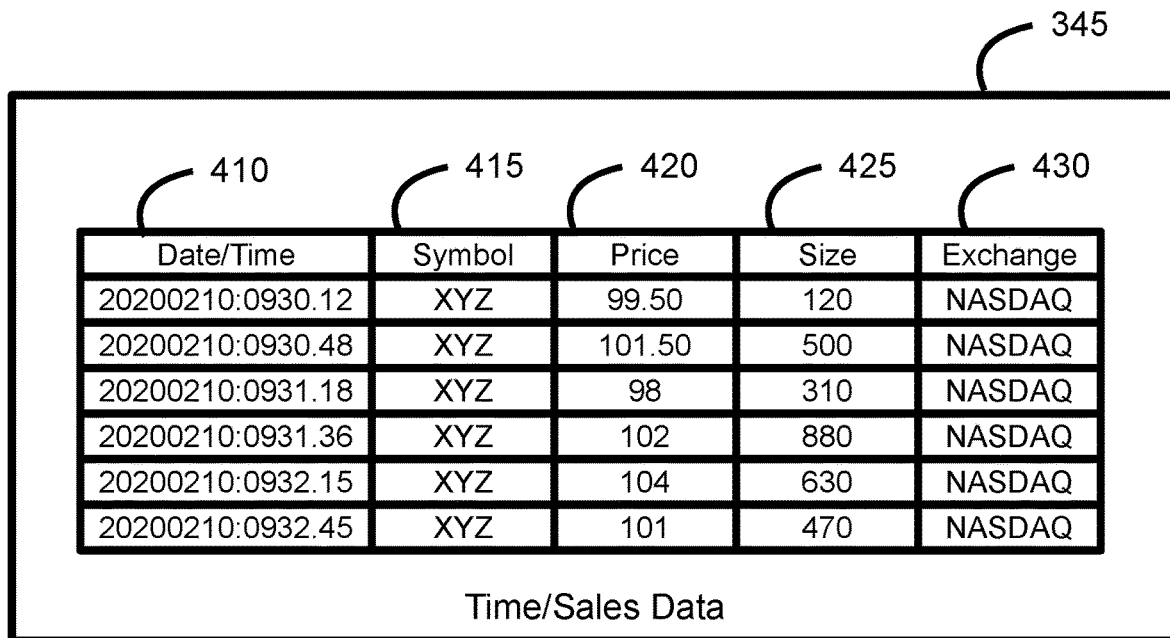
Fig. 4-A
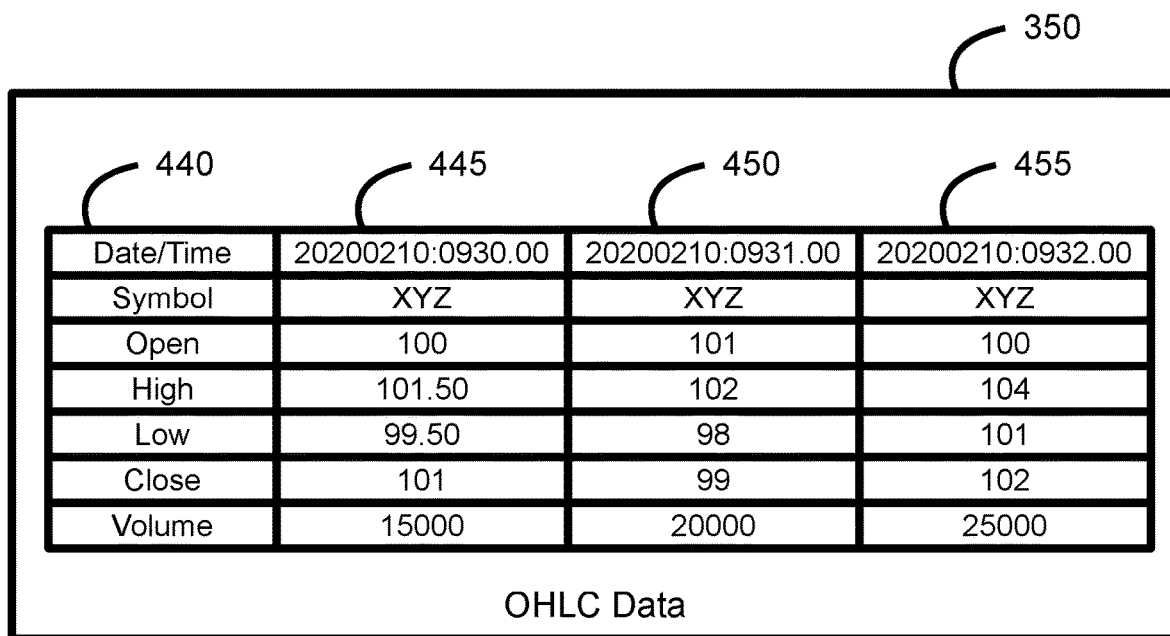
Fig. 4-B

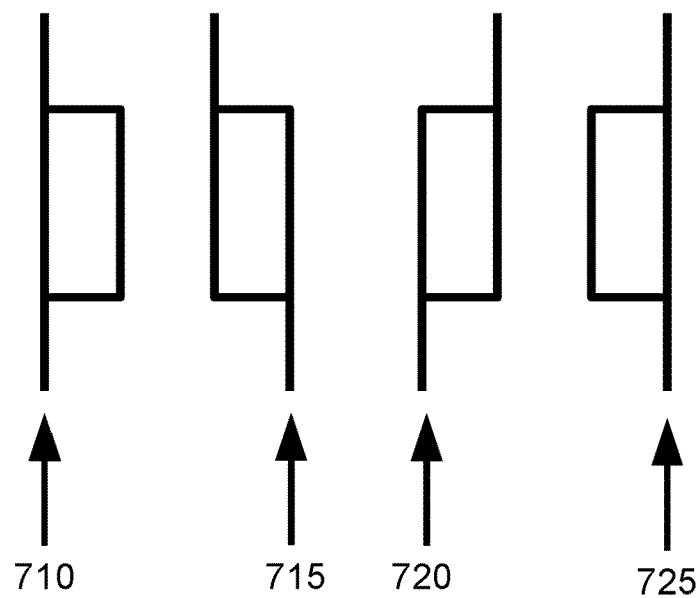
Fig. 7-A
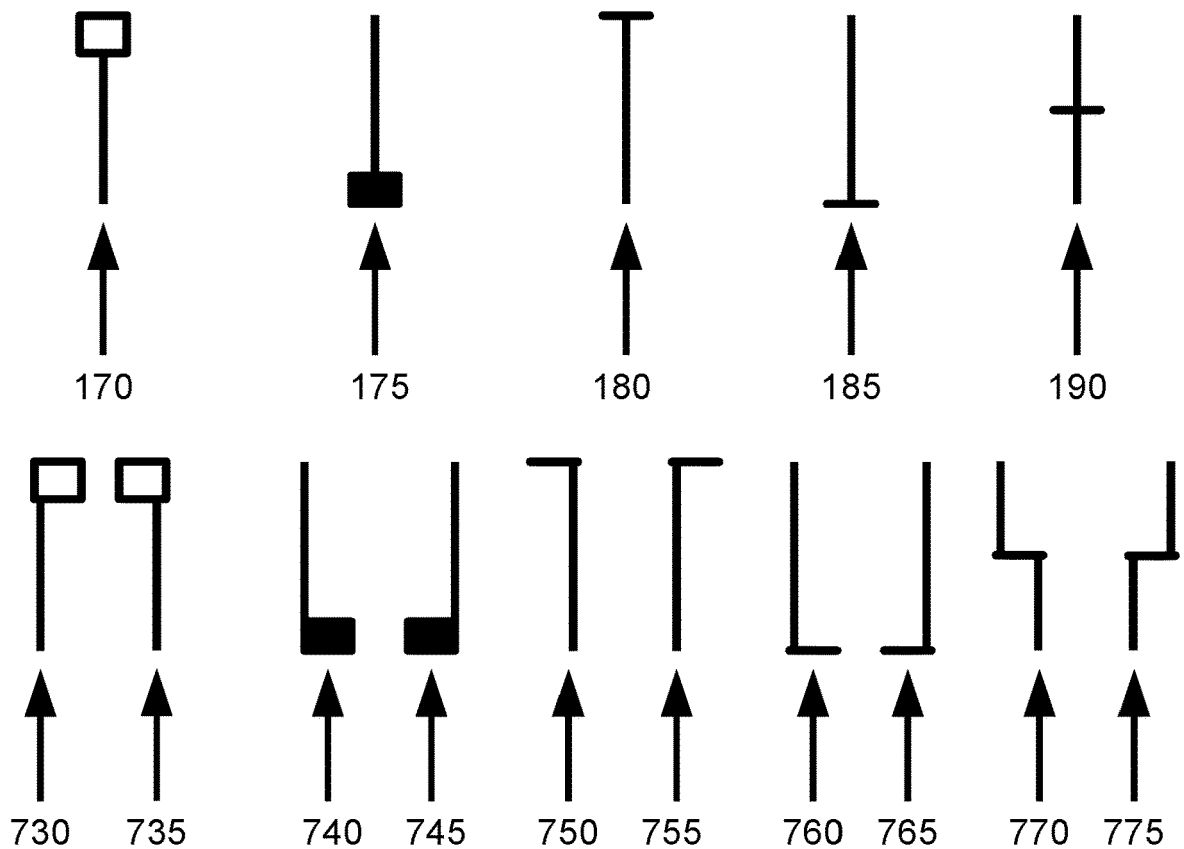
Fig. 7-B

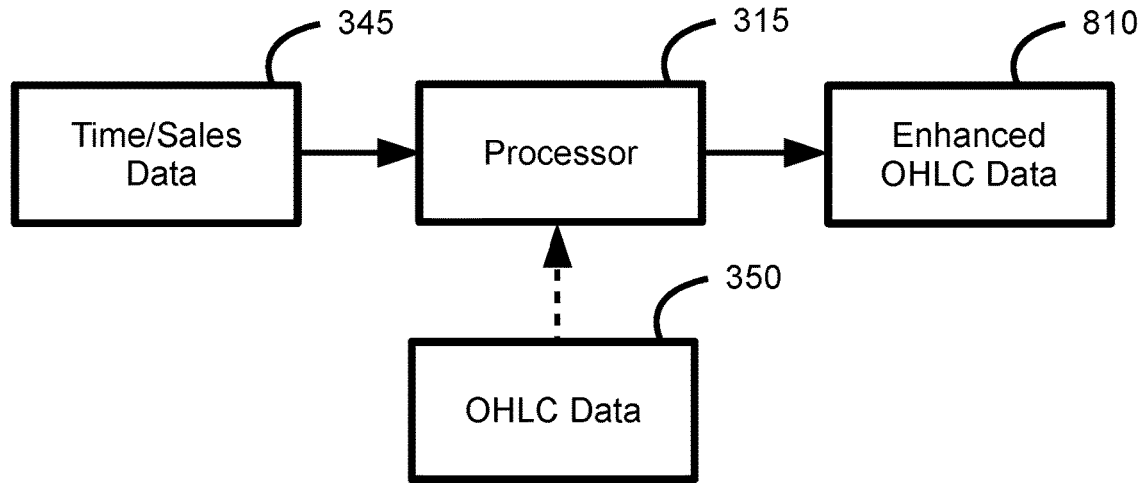
Fig. 8-A
| Date/Time | 20200210:0930.00 | 20200210:0931.00 | 20200210:0932.00 |
|---|---|---|---|
| Symbol | XYZ | XYZ | XYZ |
| Open | 100 | 101 | 100 |
| High | 101.50 | 102 | 104 |
| Low | 99.50 | 98 | 101 |
| Close | 101 | 99 | 102 |
| Volume | 15000 | 20000 | 25000 |
| Time of High | 0930.48 | 0931.36 | 0932.15 |
| Time of Low | 0930.12 | 0931.18 | 0932.45 |
| High Time % | 80 | 60 | 25 |
| Low Time % | 20 | 30 | 75 |
Fig. 8-B

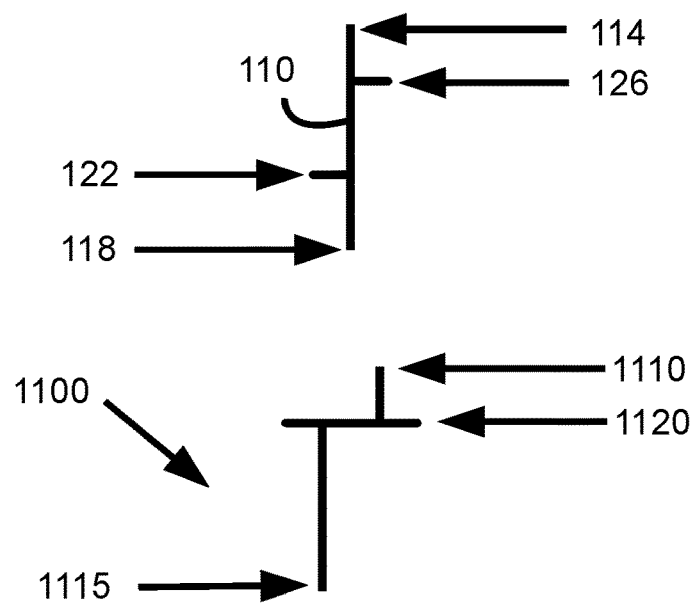
Fig. 11-A
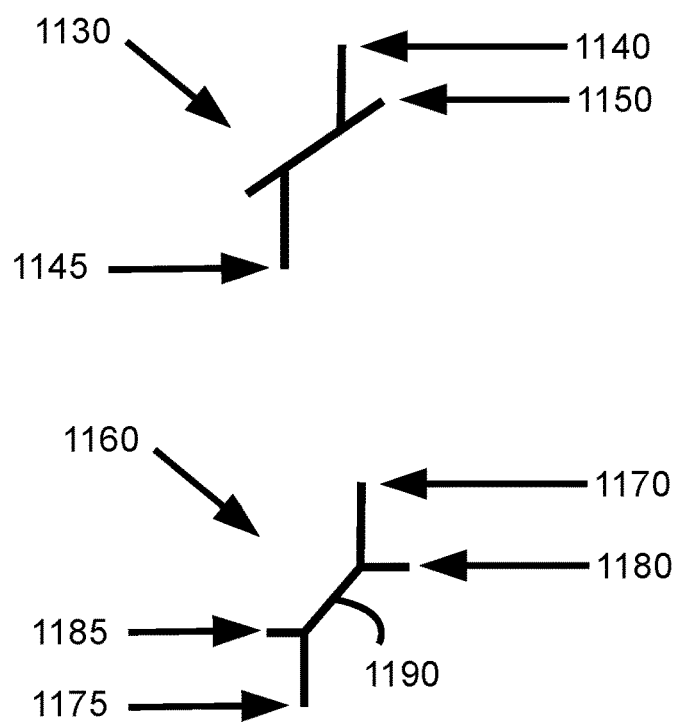
Fig. 11-B

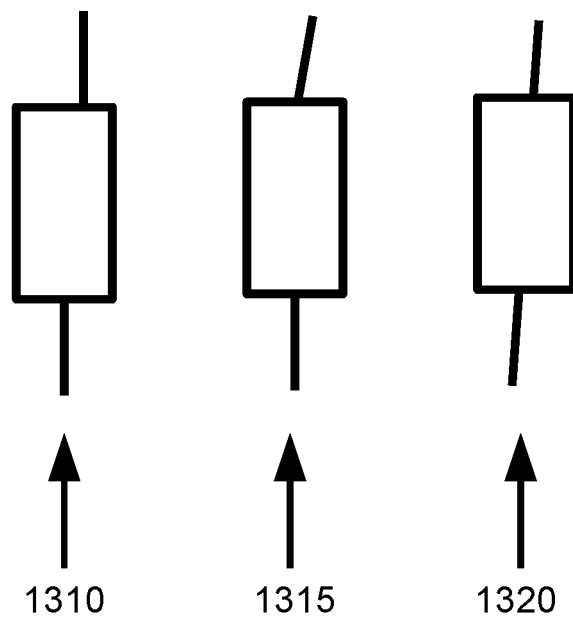
Fig. 13-A
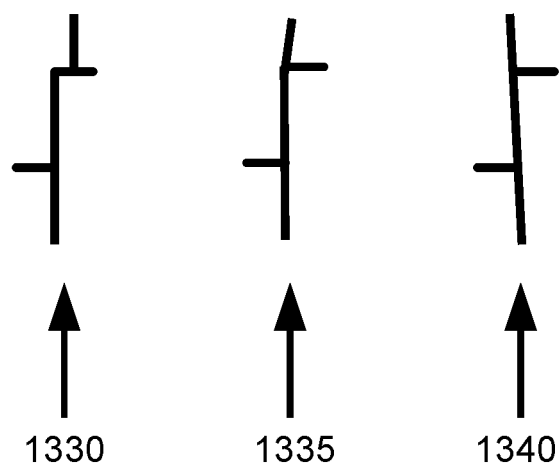
Fig. 13-B

DYNAMIC PRICE RANGE SYMBOL UPDATE AND DISPLAY SYSTEM, METHOD, AND DEVICE

CROSS REFERENCE TO RELATED APPLICATIONS

This application is a continuation in part of U.S. patent application Ser. No. 16/935,084, filed Jul. 21, 2020, which is a continuation in part of U.S. patent application Ser. No. 16/932,345, filed Jul. 17, 2020, which is a continuation in part of U.S. patent application Ser. No. 16/790,512, filed Feb. 13, 2020, each of which are incorporated by reference herein in its entirety.

FIELD OF THE INVENTION

This invention generally relates to a computer implemented charting method and more specifically relates to a system, method, and device for generating and displaying enhanced price bar type charts representative of a price range of a market traded security during a time period.

BACKGROUND OF THE INVENTION

A bar chart also known as a OHLC (Open, High, Low, Close) chart is a collection of price bars, with each bar showing the price movements for a given time period. As shown in prior art of FIG. 1-A, each bar has a vertical line 110 that shows the highest price 114 and the lowest price 118 reached during the time period. The opening price 122 is marked by a tick mark of a small horizontal line on the left of the vertical line 110, and the closing price 126 is marked by a tick mark of a small horizontal line on the right of the vertical line 110. A bar chart variation might only display a HLC (High, Low, Close) chart including HLC bars that omit the opening price 122 and does not include the tick mark of a small horizontal line on the left of the vertical line 110. Bar charts are very similar to Japanese candlestick charts. The two chart types show the same information but in different ways. Candlesticks also have a vertical line showing the high and low of the period, but the difference between the open and close is represented by a thicker portion called a body. Neither of these charts show more specific information as to when the high price and low price occurred during that given time period nor do these charts even indicate which of a high price and low price came first.

Since the latter part of the nineteenth century far-eastern traders have used candlesticks for charting markets and for analysis based on trends in market psychology. Candlestick patterns are now commonly used in technical analysis to describe price movements of securities (e.g., stocks, bonds, ETFs, mutual funds, etc.), derivatives (e.g., options, forwards, futures, swaps, etc.), indices, or currencies over time. As shown in prior art of FIG. 1-B, the candlestick consists of a rectangular body 130, the height of which represents the difference between a time period's open price 134 and close price 138. A centerline projecting from the top of the rectangle extends upward to the period's high price 142 is known as an upper wick 146 whereas a similar centerline extends from the bottom to the period's low price 150 is known as a lower wick 154. When the closing trade price 138 is higher than its opening trade price 134, the body 130 of the up or bullish candlestick is filled with usually a white or green color. As shown in prior art of FIG. 1-C, as the opening trade price 134 is higher than its closing trade price 138, the body of the down or bearish candlestick is filled 158 with usually a black or red color.

The length of the candlestick varies with the price difference. When the price ranges between the opening trade price and the closing trade price increase, the body will be lengthened. Likewise, the upper or lower wick will be lengthened due to the highest or lowest trade price, respectively. As shown in prior art of FIG. 1-D, candlestick patterns have emerged due to the variety of sizes of both body and wicks. To name a few, a bullish Marubozu 160 and bearish Marubozu 165 have no wicks which occur when the highs and the lows also represent the opening and the closing prices and is considered a continuation pattern. A Hanging Man 170 can be a black or a white candlestick that consists of a small body near the high with a little or no upper wick and a long lower wick. The lower wick should be two or three times the height of the body and is considered a bearish pattern during an uptrend. Similarly, a Shooting Star 175 can be a black or a white candlestick that has a small body, a long upper wick and a little or no lower wick and is considered a bearish pattern in an uptrend.

A Dragonfly Doji 180 is formed when the opening and the closing prices are at the highest of the day. If it has a longer lower wick it signals a more bullish trend. When appearing at market bottoms it is considered to be a reversal signal and a Gravestone Doji 185 is formed when the opening and closing prices are at the lowest of the day. If it has a longer upper wick it signals a bearish trend. When it appears at market top it is considered a reversal signal. Lastly, a Long-Legged Doji 190 consists of a Doji with very long upper and lower wicks indicating strong forces balanced in opposition and possible market indecision. Nearly all candlestick patterns fall into three broad categories, namely bull, bear, and doji categories. There can be a price gap between adjacent candlesticks which occurs when the high and low price range of the first candlestick does not overlap with the high and low price of the second candlestick.

Both price bars and candlestick wicks are displayed along a centerline of a vertical axis to show the high and low price range of a given time period and does not offer more specific information as to when the high price and low price occurred during that given time period. Although an improvement is disclosed in U.S. Pat. No. 7,844,487 issued on Nov. 30, 2010 by Chapman, entitled, "Computer-implemented method for displaying price and value extremes" by adding angled tips to the top and bottom of a price bar to serve as additional visual indicators that show which of the high price and low price came first, such teaching relies on adding additional graphical information and remains silent on displaying more precisely when the high price and low price had occurred in a given time period.

U.S. Patent Application 20040267654 filed on Jun. 26, 2003 by Peng, et al., entitled, "Candlestick and bar charts" similarly discloses the addition of new graphical elements in the form of one or more dotted horizontal lines that yield more information as to price direction near the open and/or close price but is silent as to offering any new information regarding when either the high and low price occurred.

To date, all known charting programs from trading software, banks, brokers, independents, and third parties similarly dynamically update a current candlestick for display in a candlestick chart during price changes throughout a given time period of the candlestick by rendering and displaying the same full fixed width of the candlestick while updating the height of the body and wicks along the centerline according to each price change leaving a user without any sense of when the time period ends and left waiting to only then view the final candlestick upon learning of the close price for that time period. Analogously, the same holds true for OHLC and HLC price bars where the vertical line depicting the high price and low price remains though changing in height remains static in the same vertical position throughout the time period. The speculative reason for this is that it appears all charting engines and modules are configured to receive market data in the form of OHLC data which does not specify when the high price or low price has occurred during the time period.

Accordingly, in light of the above, there is a strong need in the art for systems, methods, and devices to overcome this lack of more specific information and provide a user with more timely and more visually accurate charting information during a given time period.

SUMMARY OF THE INVENTION

The present invention enables more specific information to help a user understand more clearly when a high price and low price occurred during a time period without adding any additional visual indicators. The present invention provides a widening body of a candlestick proportional to the percentage of traversal of the time period. The present invention enables for the replacement of conventional candlesticks with enhanced candlesticks. The present invention enables enhanced OHLC data to assist a user with research, analysis, and backtesting with historical data to visualize enhanced candlestick chart data over longer time periods of years or even decades. The present invention provides enhanced OHLC and HLC bar charts that include a separate upper price bar and lower price bar instead of a conventional centerline high-low price bar and further include an open-close bar and close bar respectively that can widen proportional to the percentage of traversal of the time period. The present invention provides a tilting of a centerline high-low price bar of a candlestick or OHLC bar to determine whether the high price or low price occurred first in the time period as well of the tilting or shifting of either upper and lower wicks or upper and lower price bars as alternate ways to visually depict such distinction without relying upon the overlaying of any graphical elements or other visual indicators. The present invention enables for generation of new alternate OHLC type price symbols such as the two intersecting lines symbol that represents the intersection of an open-close price line and a high-low price line or a quadrilateral drawn with the open price, high price, low price, close price as vertices.

In general, in accordance with the present invention a computer implemented method for displaying to a user a candlestick representative of a price range of a market traded security during at least a portion of a time period including a plurality of intratime periods includes receiving a OHLC (open, high, low, close) data of a first intratime period and a OHLC data of a second intratime period, a charting engine generating a candle body from an open price of the first intratime period and a close price of the second intratime period, determining a highest intratime period having a highest price from each high price of each the intratime period and a lowest intratime period having a lowest price from each low price of each the intratime period, the charting engine generating at least one of an upper wick and lower wick, a bottom of the upper wick connected to a top of the candle body above the highest intratime period and a top of the lower wick connected to a bottom of the candle body below the lowest intratime period, and the charting engine displaying the candlestick including the candle body and the at least one of the upper wick and lower wick, where the candlestick visually depicts and enables the user to see proportional to a width of the candle body when the upper wick and the lower wick have occurred during the at least a portion of the time period.

In accordance with an aspect of the present invention, a computer implemented method for displaying to a user a HLC (high, low, close) symbol representative of a price range of a market traded security during at least a portion of a time period including a plurality of intratime periods includes receiving a HLC data of a first intratime period and a HLC data of a second intratime period, a charting engine generating a horizontal close price bar at a close price of the second intratime period, the close price bar spanning across the first intratime period and the second intratime period, determining a highest intratime period having a highest price from each high price of each the intratime period and a lowest intratime period having a lowest price from each low price of each the intratime period, the charting engine generating at least one of an upper price bar and lower price bar, a bottom of the upper price bar connected to a top of the close price bar above the highest intratime period and a top of the lower price bar connected to a bottom of the close price bar below the lowest intratime period, and the charting engine displaying the HLC symbol including the close price bar and the at least one of the upper price bar and lower price bar, where the HLC symbol visually depicts and enables the user to see proportional to a width of the close bar when the upper price bar and the lower price bar have occurred during the at least a portion of the time period.

In accordance with another aspect of the present invention, a computer implemented method for displaying to a user a OHLC (open, high, low, close) symbol representative of a price range of a market traded security during at least a portion of a time period including a plurality of intratime periods includes receiving a OHLC data of a first intratime period and a OHLC data of a second intratime period, a charting engine generating an open-close price bar drawn from an open price of the first intratime period and a close price of the second intratime period, determining a highest intratime period having a highest price from each high price of each the intratime period and a lowest intratime period having a lowest price from each low price of each the intratime period, the charting engine generating at least one of an upper price bar and lower price bar, a bottom of the upper price bar connected to a top of the open-close price bar above the highest intratime period and a top of the lower price bar connected to a bottom of the open-close price bar below the lowest intratime period, and the charting engine displaying the OHLC symbol including the open-close price bar and the at least one of the upper price bar and lower price bar, where the OHLC symbol visually depicts and enables the user to see proportional to a width of the open-close bar when the upper price bar and the lower price bar have occurred during the at least a portion of the time period.

In accordance with an aspect of the present invention, a computer implemented method for displaying to a user a OHLC (open, high, low, close) price symbol representative of a price range of a market traded security during a time period includes generating the OHLC price symbol in the form of a quadrilateral including a first vertex representative of an open price at a start of the time period, a second vertex representative of a high price at a first time during the time period, a third vertex representative of a low price at a second time during the time period, and a fourth vertex representative of a close price at an end of the time period, and displaying the OHLC price symbol to the user.

In accordance with another aspect of the present invention, a computer implemented method for displaying to a user a HLC (high, low, close) price symbol representative of a price range of a market traded security during a time period includes generating the HLC price symbol in the form of a triangle including a first vertex representative of a high price at a first time during the time period, a second vertex of a low price at a second time during the time period, and a third vertex representative of a close price at an end of the time period, and displaying the HLC price symbol to the user.

In accordance with an aspect of the present invention, a computer implemented method for displaying to a user a OHLC (open, high, low, close) bar representative of a price range of a market traded security during a time period includes a charting engine generating and displaying an open-close price line drawn from an open price to a close price of the time period and the charting engine generating and displaying a high-low price line intersecting the open-close price line wherein the high-low price line is drawn from a high price at a first time during the time period to a low price at a second time during the time period.

In accordance with another aspect of the present invention, a computer implemented method for displaying to a user a OHLC (open, high, low, close) bar representative of a price range of a market traded security during a time period includes determining whether the low price occurred before the high price during the time period, a charting engine generating and displaying an open-high price line drawn from an open price at a start of the time period to a high price at a first time of the time period, a high-low price line drawn from the high price at the first time during the time period to a low price at a second time during the time period, and a low-close price line drawn from the low price at the second time during the time period to the close price at an end of the time period if the low price occurred after the high price, and the charting engine generating and displaying an open-low price line drawn from the open price at the start of the time period to the low price at the second time of the time period, a low-high price line drawn from the low price at the second time during the time period to the high price at the first time during the time period, and a high-close price line drawn from the high price at the first time during the time period to the close price at the end of the time period if the low price occurred before the high price.

In accordance with an aspect of the present invention, a computer implemented method for displaying to a user a OHLC (open, high, low, close) bar representative of a price range of a market traded security during a time period includes determining whether the low price occurred before the high price during the time period, a charting engine generating and displaying an open price line drawn horizontally from an open price at a start of the time period to perpendicularly connect with a bottom of a vertically drawn high price line of a high price at a first time of the time period and a close price line drawn horizontally from a close price at an end of the time period to perpendicularly connect with a top of a vertically drawn low price line of a low price at a second time of the time period if the low price occurred after the high price, and the charting engine generating and displaying the open price line drawn horizontally from the open price at the start of the time period to perpendicularly connect with a top of a vertically drawn low price line of the low price at the second time of the time period and the close price line drawn horizontally from the close price at the end of the time period to perpendicularly connect with a bottom of a vertically drawn high price line of the high price at the first time of the time period if the low price occurred before the high price.

In accordance with another aspect of the present invention a computer implemented method for displaying to a user a price range of a market traded security during a time period includes a charting engine displaying a price bar, the price bar having a width representative of the time period; generating at least one of an upper price bar and lower price bar, the upper price bar having a height representative of a high price at a first time during the time period and the lower price bar having a height representative of a low price at a second time during the time period, connecting a bottom of the upper price bar to a top of the price bar, the connection dividing the top of the price bar into a first top part and a second top part wherein the ratio between the first top part and the top of the price bar corresponds to the ratio between the first time and the time period and connecting a top of the lower price bar to a bottom of the price bar, the connection dividing the bottom of the price bar into a first bottom part and a second bottom part wherein the ratio between the first bottom part and the bottom of the price bar corresponds to the ratio between the second time and the time period, and the charting engine displaying the price bar, the upper price bar, and the lower price bar that visually depicts and enables the user to see proportional to the price bar when the upper price bar and the lower price bar have occurred during the time period.

In accordance with an aspect of the present invention, a computer implemented method for displaying to a user a HLC (high, low, close) bar representative of a price range of a market traded security during a time period including a plurality of intratime periods includes a charting engine displaying a first vertical line having a height representative of a range between a first high price and first low price from a HLC data of a first intratime period having a first close price, the charting engine displaying a second vertical line adjacent to the first vertical line, the second vertical line having a height representative of a range between a second high price and second low price from a HLC data of a second intratime period having a second close price, determining a highest intratime period having a highest price from each high price of each the intratime period and a lowest intratime period having a lowest price from each low price of each the intratime period, generating the HLC bar including a horizontal close bar and at least one of an upper bar and lower bar by removing all portions of all vertical lines above and below the second close price from all intratime periods other than above the second close price of the highest intratime period and below the second close price of the lowest intratime period, and the charting engine displaying the HLC bar, wherein the HLC bar visually depicts and enables the user to see proportional to the horizontal close bar when the upper bar and the lower bar have occurred during the time period.

In accordance with another aspect of the present invention, a computer implemented method for displaying to a user a OHLC (open, high, low, close) bar representative of a price range of a market traded security during a time period including a plurality of intratime periods includes a charting engine displaying a first vertical line having a height representative of a range between a first high price and first low price from a OHLC (open, high, low, close) data of a first intratime period, the charting engine displaying a second vertical line adjacent to the first vertical line, the second vertical line having a height representative of a range between a second high price and second low price from a OHLC data of a second intratime period having a close price, determining a highest intratime period having a highest price from each high price of each the intratime period and a lowest intratime period having a lowest price from each low price of each the intratime period, generating an open-close line from an open price of the time period and the close price of the second intratime period, and the charting engine generating and displaying the OHLC bar by displaying the open-close line overlayed upon the first vertical line and the second vertical line and generating at least one of an upper bar and lower bar by removing all portions of all vertical lines above and below the open-close line from all intratime periods other than above the open-close line of the highest intratime period and below the open-close line of the lowest intratime period, wherein the OHLC bar visually depicts and enables the user to see proportional to the open-close line when the upper bar and the lower bar have occurred during the time period.

In accordance with an aspect of the present invention, a computer implemented method for displaying a candlestick representative of a price range of a market traded security during a time period having a plurality of intratime periods includes a charting engine displaying a first vertical line having a height representative of a range between a first high price and first low price from a OHLC data of a first intratime period, the charting engine displaying a second vertical line adjacent to the first vertical line, the second vertical line having a height representative of a range between a second high price and second low price from a OHLC data of a second intratime period, generating a body from an open price of the time period and a close price of the second intratime period, determining a highest intratime period having a highest price from each high price of each intratime period and a lowest intratime period having a lowest price from each low price of each intratime period, and the charting engine generating and displaying the candlestick by displaying the body overlayed upon the first vertical line and the second vertical line and generating at least one of an upper wick and lower wick by removing all portions of all vertical lines outside of the body from all intratime periods other than above the body from the highest intratime period and below the body of the lowest intratime period.

In accordance with another aspect of the present invention, a computer implemented method for displaying a candlestick representative of a price range of a market traded security during a time period includes calculating a size of a body of the candlestick, the body having a width and height where the width is representative of the time period and the height is representative of a range between an open price and a close price during the time period, calculating a size of at least one of an upper wick and lower wick of the candlestick, the upper wick having a height representative of a high price at a first time during the time period and the lower wick having a height representative of a low price at a second time during the time period, a charting engine generating the candlestick by connecting a bottom of the upper wick substantially perpendicular to a top of the body, the connection dividing the top of the body into a first top part and a second top part where the ratio between the first top part and the top of the body corresponds to the ratio between the first time and the time period and connecting a top of the lower wick substantially perpendicular to a bottom of the body, the connection dividing the bottom of the body into a first bottom part and a second bottom part where the ratio between the first bottom part and the bottom of the body corresponds to the ratio between the second time and the time period, and displaying the candlestick.

In accordance with an aspect of the present invention, a computer implemented method includes modifying a display of a candlestick representative of a price range of a market traded security during a time period where the candlestick includes a body and at least one of an upper wick and lower wick, the body having a width and height where the width is representative of the time period and the height is representative of a range between an open price and a close price during the time period, the upper wick having a centerline projecting from a top of the body having a height representative of a high price at a first time during the time period and the lower wick having a centerline projecting from a bottom of the body having a height representative of a low price at a second time during the time period by a charting engine generating a modified candlestick by moving the upper wick from the centerline to a connection point substantially perpendicular to the top of the body, the connection point dividing the top of the body into a first top part and a second top part where the ratio between the first top part and the top of the body corresponds to the ratio between the first time and the time period and moving the lower wick from the centerline to a connection point substantially perpendicular to the bottom of the body, the connection point dividing the bottom of the body into a first bottom part and a second bottom part where the ratio between the first bottom part and the bottom of the body corresponds to the ratio between the second time and the time period, and the charting engine displaying the modified candlestick.

In accordance with another aspect of the present invention, a computer implemented method for modifying to a user a display of a candlestick representative of a price range of a market traded security during a time period wherein the candlestick includes a body and at least one of an upper wick and lower wick, the body having a width and height wherein the width is representative of the time period and the height is representative of a range between an open price and a close price during the time period, the upper wick having a centerline projecting from a top of the body having a height representative of a high price at a first time during the time period and the lower wick having a centerline projecting from a bottom of the body having a height representative of a low price at a second time during the time period including determining whether the low price occurred before the high price during the time period, a charting engine generating a modified candlestick by at least one of a moving the upper wick to the right of the centerline to a connection point substantially perpendicular to the top of the body and moving the lower wick to the left of the centerline to a connection point substantially perpendicular to the bottom of the body if the low price occurred before the high price and at least one of a moving the upper wick to the left of the centerline to a connection point substantially perpendicular to the top of the body and moving the lower wick to the right of the centerline to a connection point substantially perpendicular to the bottom of the body if the low price occurred after the high price, and the charting engine displaying the modified candlestick visually depicting to the user whether the low price occurred before or after the high price during the time period.

In accordance with an aspect of the present invention, a computer implemented method for modifying to a user a display of a candlestick representative of a price range of a market traded security during a time period wherein the candlestick includes a body and at least one of an upper wick and lower wick, the body having a width and height wherein the width is representative of the time period and the height is representative of a range between an open price and a close price during the time period, the upper wick having a centerline projecting from a top of the body having a height representative of a high price at a first time during the time period and the lower wick having a centerline projecting from a bottom of the body having a height representative of a low price at a second time during the time period including determining whether the low price occurred before the high price during the time period, a charting engine generating a modified candlestick by at least one of a tilting a top of the upper wick clockwise and tilting a bottom of the lower wick clockwise from a pivot of the centerline if the low price occurred before the high price and at least one of a tilting a top of the upper wick counter-clockwise and tilting a bottom of the lower wick counter-clockwise from a pivot of the centerline if the low price occurred after the high price, and the charting engine displaying the modified candlestick visually depicting to the user whether the low price occurred before or after the high price during the time period.

In accordance with another aspect of the present invention, a computer implemented method for modifying to a user a display of OHLC price bar representative of a price range of a market traded security during a time period wherein the OHLC price bar includes a vertical price bar having a center point and a height representative of a range between a high price and low price during the time period including determining whether the low price occurred before the high price during the time period, a charting engine generating a modified OHLC price bar by tilting the vertical price bar clockwise from the center point of the vertical price bar if the low price occurred before the high price and tilting the vertical price bar counter-clockwise from the centerpoint of the vertical price bar if the low price occurred after the high price, and the charting engine displaying the modified OHLC price bar visually depicting to the user whether the low price occurred before or after the high price during the time period.

In accordance with an aspect of the present invention, an article of manufacture including a non-transitory computer readable medium having instructions stored thereon, the instructions configured to cause a computer to perform operations including one or more a computer implemented methods listed above.

In accordance with another aspect of the present invention, an apparatus includes a memory element of a computer configured to store computer readable instructions in operative association with a processor for the computer configured to read and execute the computer readable instructions stored in the non-transitory computer readable medium listed above.

BRIEF DESCRIPTION OF THE DRAWINGS

FIG. 1-A is a prior art illustration of a bullish OHLC bar.
FIG. 1-B is a prior art illustration of a bullish candlestick.
FIG. 1-C is a prior art illustration of a bearish candlestick.
FIG. 1-D is a prior art illustration of different types of candlesticks.
FIG. 4-A is a prior art depiction of a portion of a data structure for market data such as time/sales data.
FIG. 4-B is a prior art depiction of a portion of a data structure for market data such as OHLC data.
FIG. 7-A is an illustration of enhanced candlesticks having both an upper wick and lower wick that can be generated in accordance with the present invention.
FIG. 7-B is an illustration of more enhanced candlesticks that can be generated in accordance with the present invention.
FIG. 8-A is a block diagram of a processor used to produce enhanced OHLC data in accordance with the present invention.
FIG. 8-B is a depiction of a portion of a data structure for the enhanced OHLC data in accordance with the present invention.
FIG. 11-A is an illustration of an enhanced HLC price bar that can be generated in accordance with the present invention.
FIG. 11-B is an illustration of enhanced OHLC price bars that can be generated in accordance with the present invention.
FIG. 13-A is an illustration of alternate enhanced candlesticks that can be generated in accordance with the present invention.
FIG. 13-B is an illustration of alternate enhanced OHLC price bars that can be generated in accordance with the present invention.

DETAILED DESCRIPTION OF THE INVENTION

Figure 2:
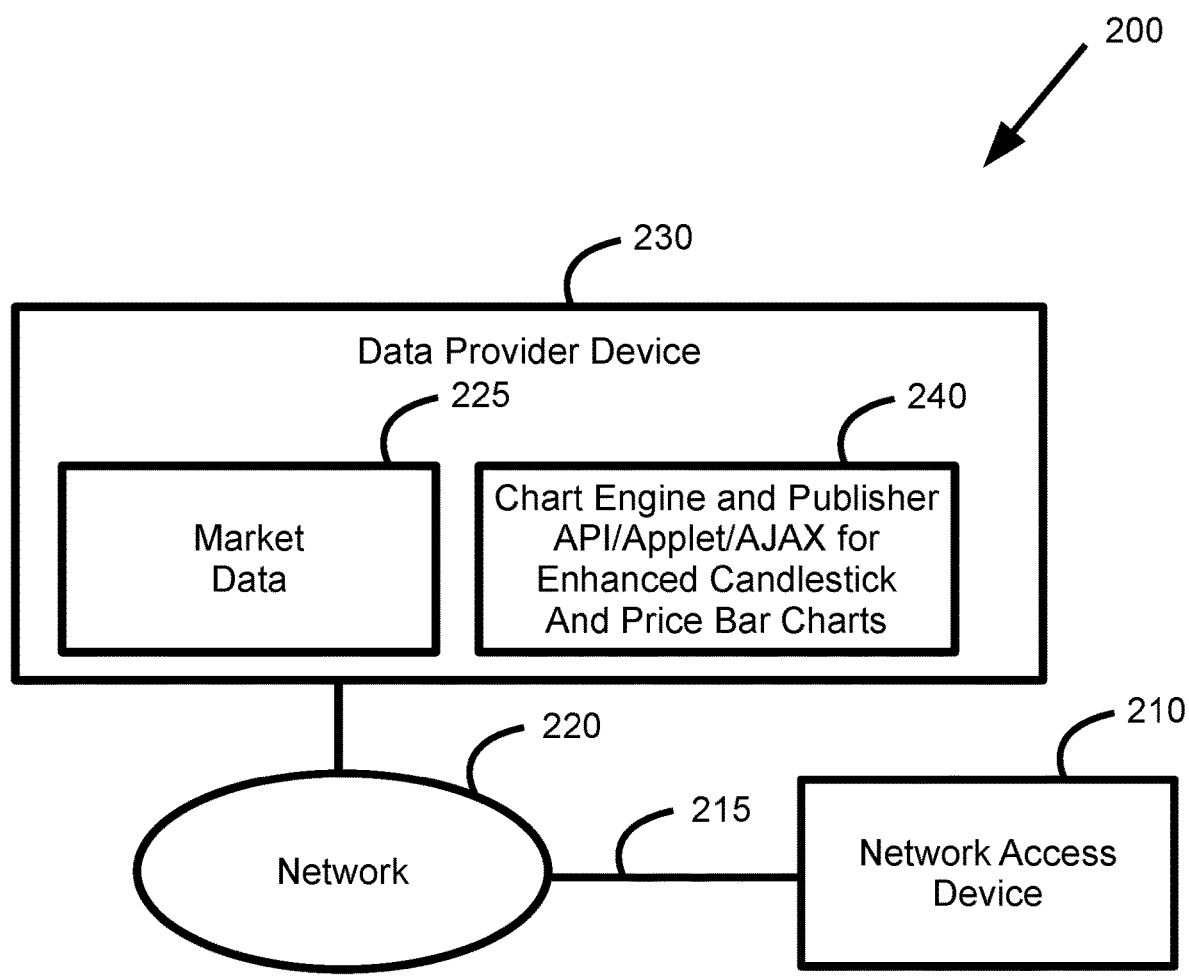
FIG. 2 is a block diagram of an exemplary distributed computer system in accordance with the present invention.

The present invention will now be described with reference to the drawings, wherein like reference numerals are used to refer to like elements throughout.

FIG. 2 illustrates an exemplary system for providing a distributed computer system 200 in accordance with one aspect of the present invention and includes one or more network access devices such as device of a user 210, connected 215 via a network 220. The network 220 may use Internet communications protocols (IP) to allow network access devices 210 communicate with each other to communicate securities, derivatives, and currencies market data 225 stored and streamed from the cloud via at least one data provider device 230, for example. Such network access devices 210 and data provider devices 230 can be configured as client/server, peer-to-peer, publish-subscribe, processing agent, ad-hoc, and the like. It is understood that a single network access device 210 and a data provider device 230 may be configured to perform both the client/server or publisher/subscriber roles.

The communication device of such network access device may include a transceiver, a modem, a network interface card, or other interface devices to communicate with the electronic network 220 and may further be operatively coupled to and/or include a Global Positioning System (GPS) via a GPS receiver (not shown). The modem may communicate with the electronic network 220 via a line 215 such as a telephone line, an ISDN line, a coaxial line, a cable television line, a fiber optic line, or a computer network line. Alternatively, the modem may wirelessly communicate with the electronic network 220. The electronic network 220 may provide an on-line service, an Internet service provider, a local area network service, a wide area network service, a cable television service, a wireless data service, an intranet, a satellite service, or the like.

Such network access devices may be hand held devices, palmtop computers, personal digital assistants (PDAs), tablets, notebook, laptop, portable computers, desktop PCs, workstations, and/or larger/smaller computer systems. It is noted that the network access devices may have a variety of forms, including but not limited to, a general purpose computer, a network computer, an internet television, a set top box, a web-enabled telephone, an internet appliance, a portable wireless device, a game player, a video recorder, and/or an audio component, for example.

Each network access device may typically include one or more memories 310, processors 315, and input/output devices 320. An input device may be any suitable device for the user to give input, for example: a keyboard, a 10-key pad, a telephone key pad, a light pen or any pen pointing device, a touchscreen, a button, a dial, a joystick, a steering wheel, a foot pedal, a mouse, a trackball, an optical or magnetic recognition unit such as a bar code or magnetic swipe reader, a voice or speech recognition unit, a remote control attached via cable or wireless link to a game set, television, and/or cable box. A data glove, an eye-tracking device, or any MIDI device may also be used. A display device may be any suitable output device, such as a display screen, text-to-speech converter, printer, plotter, fax, television set, or audio player. Although the input device is typically separate from the display device, they may be combined; for example: a display with an integrated touchscreen, a display with an integrated keyboard, or a speech-recognition unit combined with a text-to-speech converter.

Those skilled in the art will appreciate that the computer environment 200 shown in FIG. 2 is intended to be merely illustrative. The present invention may also be practiced in other computing environments. For example, the present invention may be practiced in multiple processor environments wherein the network access device includes multiple processors. Moreover, the network access device need not include all of the input/output devices 320 as discussed above and may also include additional devices. Those skilled in the art will appreciate that the present invention may also be practiced via Intranets and more generally in distributed environments in which a network access device requests resources from another network access device.

Figure 3:
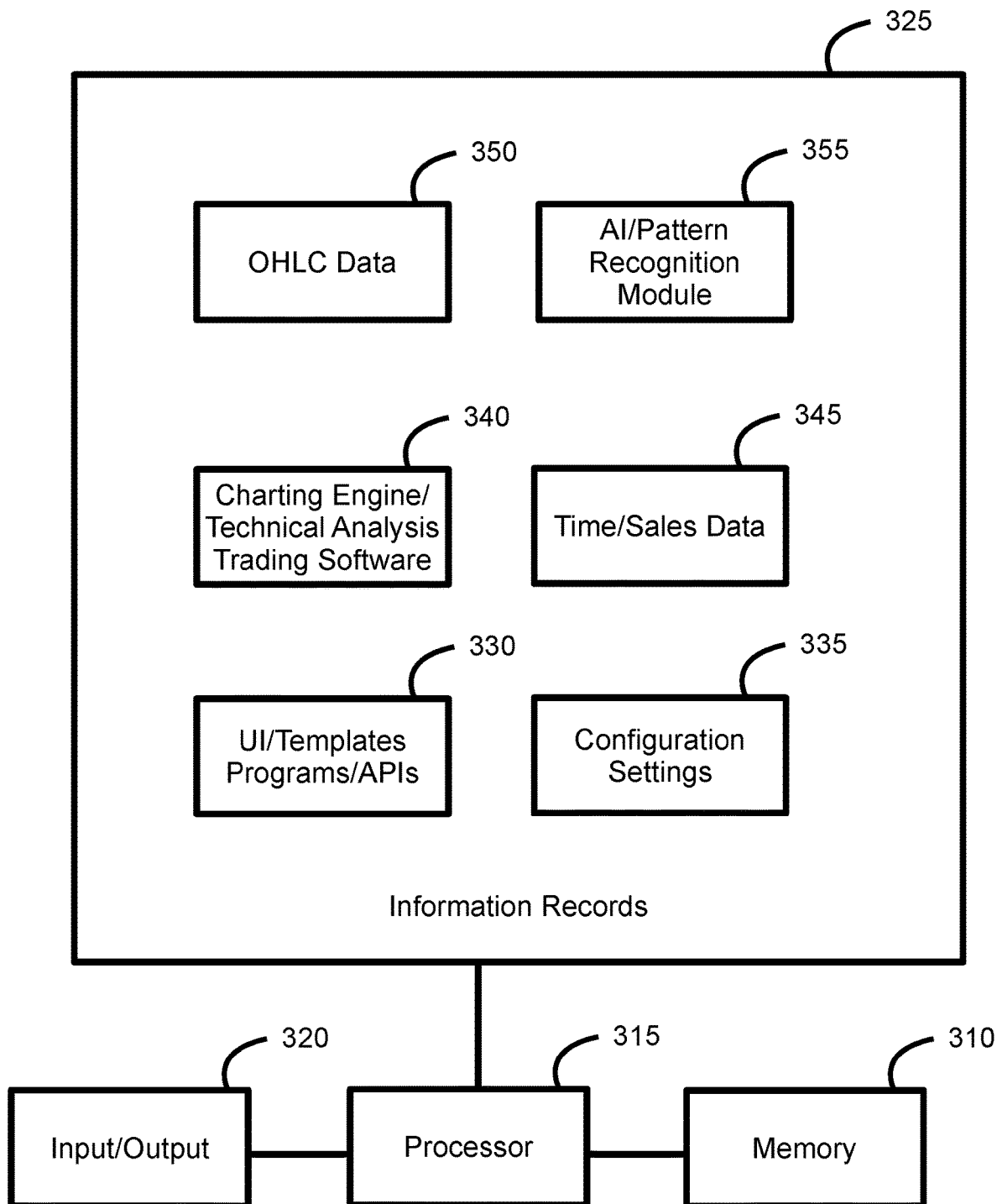
FIG. 3 is a block diagram illustrating exemplary information records stored in memory in accordance with the present invention.

FIG. 3 illustrates a block diagram of a storage device such as memory 310 in operative association with a processor 315. The processor 315 is operatively coupled to input/output devices 320 in network access devices for users and market participants of market data 225 such as traders, investors, market makers, brokers, bankers, analysts, researchers, and the like. Stored in memory 310 may be information records 325 having any combination of exemplary content such as lists, files, relational pointers, programs, interfaces, engines, modules, templates, rule sets, libraries, and databases. Such records may include for example: user interface/templates/programs/APIs (application programming interface) 330, configuration settings 335, charting engine and technical analysis module and trading software 340, time/sales data 345, OHLC data 350, and AI/pattern recognition module 355. These information records may be further introduced and discussed in more detail throughout the disclosure of this invention.

FIG. 4-A illustrates a portion of a data structure for market data 225 such as time/sales data 345. The data structure can include data fields such as a date/time 410, security or derivative symbol 415, sales price 420, size (e.g., number of shares or contracts, etc.) of the sale 425, and the exchange 430 that the sale took place.

FIG. 4-B illustrates a portion of a data structure for market data 225 such as OHLC data 350. The data structure can include data fields 440 such as a date/time 410, open price 134, high price 142, low price 150, close price 138, and volume. Each data record is representative of such data for a given time period and in turn used to represent a plurality of intratime periods within a larger given time period. For instance, each data record shows the OHLC data for a one minute interval based on the time data which can define a first intratime period 445, a second intratime period 450, a third intratime period 455, and can continue (not shown) to an endless number of intratime periods up to a last or final intratime period. For instance, if the given time period of interest is a five minute interval then five data records of one minute intervals would be used to as five intratime periods.

Those skilled in the art will appreciate that the correspondence and operative association between data fields and/or data files can take on one-to-one, one-to-many, many-toone, and many-to-many relationships. Relationships of data structures can take the form of delimited files, lists, tables, arrays, hashes, database records, objects, trees, graphs, rings, hub-spoke, and the like.

Figure 5:
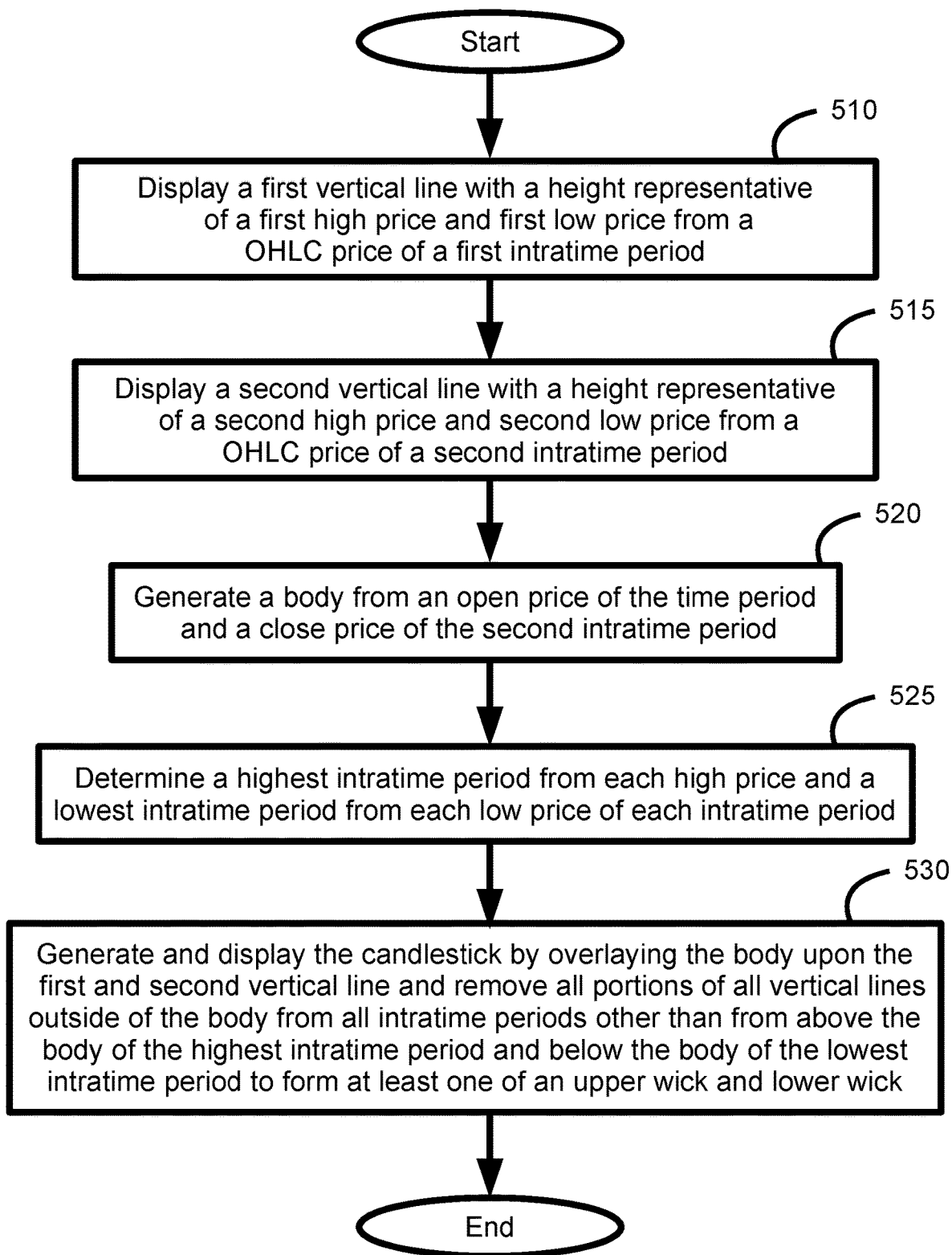
FIG. 5 is a flowchart illustrating the steps performed for processing an order in accordance with the present invention.

FIG. 5 is a flowchart illustrating the steps performed for generating and displaying a candlestick in accordance with the present invention. When a network access device 210 receives security market data 225 including OHLC data 350 a device processor 315 in operative communication with a charting engine 340 can generate and display in step 510 a first vertical line with a height representative of a range between a first high price and first low price from the OHLC data of a first intratime period and then generate and display in step 515 a second vertical line with a height representative of a range between a second high price and second low price from a OHLC data of a second intratime period.

A body from an open price of the time period and a close price of the second intratime period can be generated in step 520 and a highest intratime period from each high price and a lowest intratime period from each low price of each intratime period can be determined in step 525. The candlestick can be generated and displayed in step 530 by overlaying the body upon the first and second vertical line and removing all portions of all vertical lines outside of the body from all intratime periods other than from above the body of the highest intratime period and below the body of the lowest intratime period to form at least one of an upper wick and lower wick, respectively.

Figure 6:
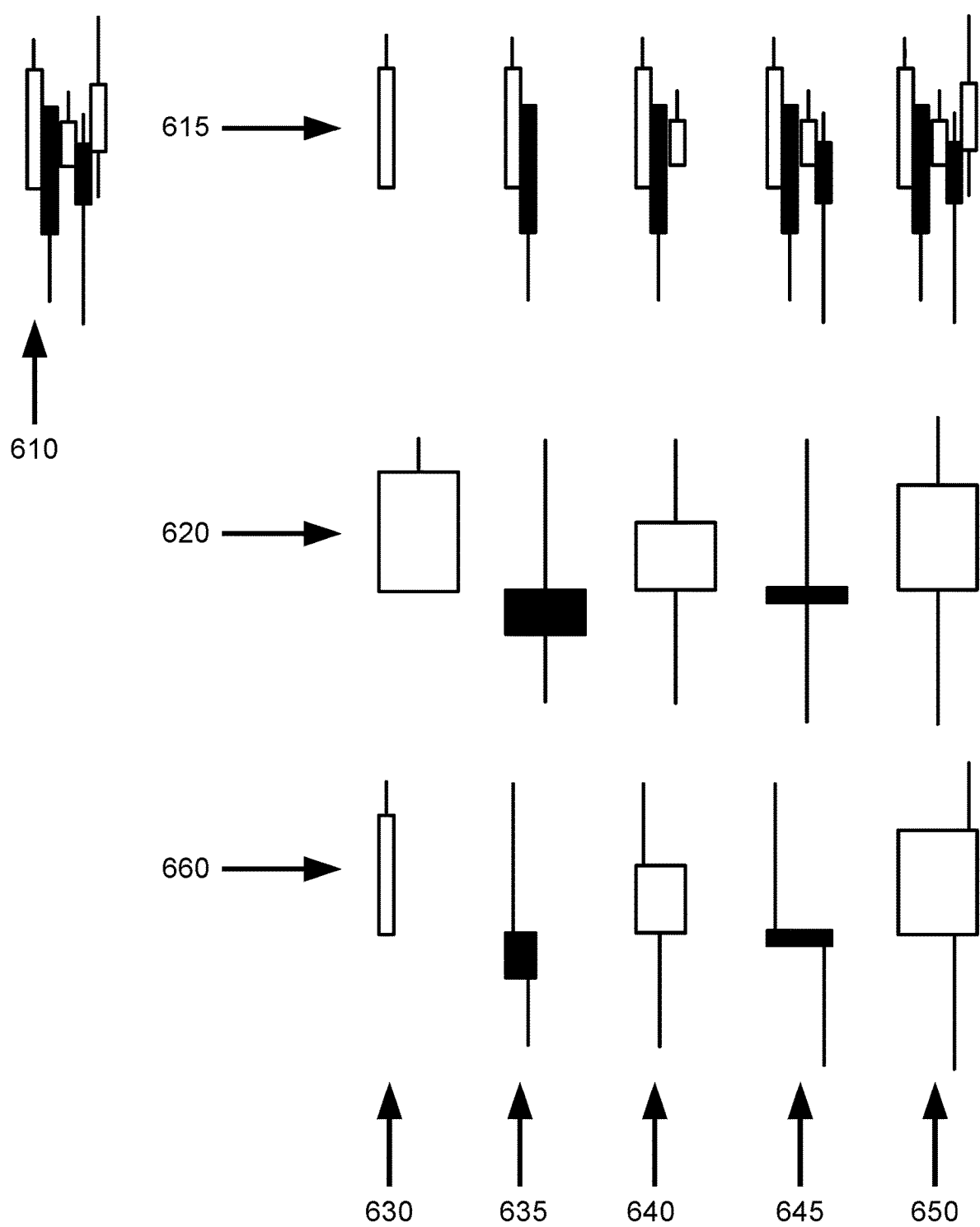
FIG. 6 is an illustration of how different kinds of candlesticks can be generated in accordance with the present invention.

FIG. 6 is an illustration of how different types of candlesticks can be generated in accordance with the present invention. A series of five OHLC prices are shown in 610 in this case shown in the form of candlesticks. For the sake of example each candlestick represents a one minute time period. The illustration shows what a prior art five minute candlestick would look like in row 620 when rendering it through known conventional techniques as each of the five OHLC prices having one minute intervals are processed. Each column represents a different one minute intratime period of the five minutes. The first column representing a first intratime period 630, a second column representing a second intratime period 635, a third column representing a third intratime period 640, a fourth column representing a fourth intratime period 645, and a fifth column representing a fifth intratime period 650.

Adjacent to the right of the five one minute candlesticks 610 shown in aggregate are the progressive sequence 615 of the same candlesticks shown as each intratime period passes. For instance, after the second intratime period 635 one can view the first two one minute candlesticks in the series of five candlesticks 610, after the third intratime period 640 one can view the first three one minute candlesticks in the series of five candlesticks 610 and so forth. One can observe the changing height of the prior art single five minute candlestick shown in row 620. In all cases the single candlestick has the same fixed width body and includes a centerline for displaying upper and lower wicks similar to how all known charting programs would render candlesticks from OHLC prices. The other drawback is that there is no way to tell how much of the five minute period has progressed from viewing the prior art candlestick.

However, a clear distinction can be shown in the last row 660, as each intratime period progresses (630, 635, 640, 645, 650) the width of the candlestick widens as wide as the width of the current and prior intratime periods rather than being a fixed width during the entire five minute time period as shown above. This gives a user a visual sense of how much time has passed during the five minute time period.

The other exemplary distinction in accordance with the present invention is that the widening candlestick shows more accurately when the high price or low price has occurred based on rendering the upper wick in the highest known intratime period and the lower wick in the lowest known intratime period. By modifying where the wicks are positioned along the body width of the candlestick provides more specific information as to when a high and low price have occurred without adding any additional graphic information.

The steps as shown in FIG. 5 can be repeated for a plurality of intratime periods for the given time period. By so doing, a widening candlestick can be dynamically generated and displayed (see 660) by repetitively displaying a current vertical line from a OHLC data of a current intratime period adjacent to all prior generated vertical lines of all prior intratime periods and repetitively generating a current body and at least one of a current upper wick and lower wick where the width of the current body is equal to the sum of the width of the current intratime period and each width of all the prior intratime periods. This can continue until a final candlestick is generated and displayed having a final body and at least one of a final upper wick and lower wick where the width of the final body is equal to the width of the time period in this case a five minute time period having five one minute intratime periods.

For example, a user may wish to view a chart rendering candlesticks in one hour intervals having access to one minute OHLC data where the body is sixty pixels wide. All known charting programs will take an hour to change the shape of a candlestick having a sixty pixel wide body once each minute. However, by employing the methods of the instant invention, a new vertical line one pixel wide is drawn each minute representing the high/low price range of an intratime period. So after thirty minutes, the candlestick generated will be thirty pixels wide because of the thirty vertical lines drawn adjacent to each other in succession with a thirty pixel wide body overlayed and all pixels removed to leave in place the upper and lower wick in their respective columns to visually indicate when the highest price and lowest price during the thirty minutes had been discovered. In this example, it could be determined at the end of the time period that the high price occurred at the tenth minute of the hour in the tenth intratime period and a low price occurred at the twenty fifth minute of the hour in the twenty fifth intratime period and as a result an upper wick would be displayed in the tenth pixel column representative of the tenth intratime period and the lower wick would be displayed in the twenty fifth pixel column representative of the twenty fifth intratime period.

If there are price gaps between two adjacent vertical lines they can get filled when the body is overlayed across those lines. In a bullish candle where the close price is higher than the open price, the body is filled white to remove all pixels inside the body frame. Most of the body is already technically drawn because each column of pixels representing each vertical line for each intratime period are drawn adjacent to each other. Further a given time period and/or intratime period can scale from the execution of a single sale price known as tick data to a batch or group of ticks data to an interval of a second to seconds or minute to minutes or hour to hours or day to days or week to weeks or month to months or year to years and beyond.

In the alternative, if dynamic generation of a widening enhanced candlestick requires too much computing resources then configuration settings 335 can be used to only display the final enhanced candlestick at the end of the last intratime period which is the same time as the end of the time period itself. So it is possible to show prior art centerline candlesticks corresponding to price changes during the time period before showing the permanent final enhanced candlestick representative of the whole time period at the end of the time period.

FIG. 7-A is an illustration of enhanced candlesticks having both an upper wick and lower wick that can be generated in accordance with the present invention. In the simplest example take a given time period of 2 minutes using one minute OHLC data, the following are basic examples of what an enhanced candlestick that includes both an upper wick and lower wick can look like. A new enhanced candlestick called a Morning Candle 710 can be formed when both a high price and low price is found in a first intratime period. A new enhanced candlestick called a Falling Candle 715 can be formed when a high price is found in a first intratime period and a low price found in the second intratime period. A new enhanced candlestick called a Rising Candle 720 can be formed when a low price is found in a first intratime period and a high price found in the second intratime period. A new enhanced candlestick called an Evening Candle 710 can be formed when both a high price and low price is found in the second intratime period. As the intratime periods increase so do the number of combinations of new enhanced candlesticks that can be generated. Configuration settings 335 can be used to provide options whether the upper and lower wicks are displayed at the start, middle, or end of the intratime period. For instance, the middle was selected for both upper and lower wicks the wick lines would render at either the 25% or the 75% along the width of the body.

FIG. 7-B is an illustration of more enhanced candlesticks that can be generated in accordance with the present invention. Now that it is shown how and why wicks of candlesticks can be moved to create enhanced candlesticks that more accurately indicate when a high price and low price has occurred in a given time period a closer look at prior art candlesticks can be reviewed and shown how they can be enhanced to create newer types of candlesticks. For instance the Hanging Man 170 can broaden into at least two new enhanced candle sticks such as an Early Hanging Man 730 and a Late Hanging Man 735 or a Shooting Star 175 can broaden into at least two new enhanced candlesticks such as a Morning Shooting Star 740 and an Evening Shooting Star 745 or a Dragonfly Doji 180 can broaden into at least two new enhanced candlesticks such as a Morning Dragonfly Doji 750 and an Evening Dragonfly Doji 755 or a Gravestone Doji 185 can broaden into at least two new enhanced candlesticks such as a Morning Gravestone Doji 760 and an Evening Gravestone Doji 765 or lastly, a Long-Legged Doji 190 can broaden into at least two new enhanced candlesticks such as a Falling Long-Legged Doji 770 and a Rising Long-Legged Doji 775. One can visually see why such Long-Legged Dojis would be described as Falling and Rising respectively as they visually depict whether the high price or low price came first and serve as more of a leading indicator as to the degree or nature of indecision that is typically attributed to Doji type candlesticks.

Those skilled in the art will appreciate that scores of enhanced candlesticks can be named by the use of the techniques described in this instant invention which may offer greater degree of granularity and insight toward those speculators applying technical analysis of trends and reversals based on such new visual information. Further, a single enhanced candlestick can serve as a visual summary or substitute for more complex conventional candlestick patterns of a plurality of candlesticks across multiple intratime periods.

FIG. 8-A is a block diagram of a processor used to produce enhanced OHLC data in accordance with the present invention. A device processor 315 can receive time/sales data 345 and parse through all sales for a given time period. The first sale of the period is the open price and last sale of the period is the close price. After all sales are parsed it can be determined which sale at what time had the highest price as well as which sale at what time had the lowest price. OHLC data 350 of prior art is usually produced this way from time/sales data. However such OHLC data 350 format only discloses price and volume for a time period and neglects to include the absolute time of the high and low price and also neglects to include a percentage of time relative to the time period of the high and low price. Enhanced OHLC data 810 can be generated by the processor and stored to include the absolute time of the highest price and absolute time of the lowest price for the time period which can be stored as a data record or delimited list. Newly packaged enhanced OHLC data makes adoption to enhanced candlestick charts quicker and easier.

When time/sales data is not available, enhanced OHLC data 810 can also be generated by the processor 315 from known OHLC data 350. For instance, investors may not be as concerned with hourly price fluctuations and might only wish to chart a security with daily OHLC data. Since there are three hundred ninety minutes in a trading day, the processor 315 can parse through intraday OHLC data in one minute intervals to determine which minute of the day had the highest price and which intratime period of the day had the lowest price. In one example, those intratime periods can be coded as values of daily percentage of time of the high price and daily percentage of time of the low price which could be stored as part of the enhanced OHLC daily data 810.

FIG. 8-B is a depiction of a portion of a data structure for the enhanced OHLC data in accordance with the present invention. Additional fields such as time of high price 820, time of low price 825, high price time percentage 830, and low price time percentage 835 can be generated as referenced above and included in the data structure to enhance OHLC data 810. Each record shows an absolute time and can also include percentage of time relative to the intratime period to make it quicker and easier for charting engines to generate enhanced candlesticks as referenced throughout this instant invention.

Figure 9:
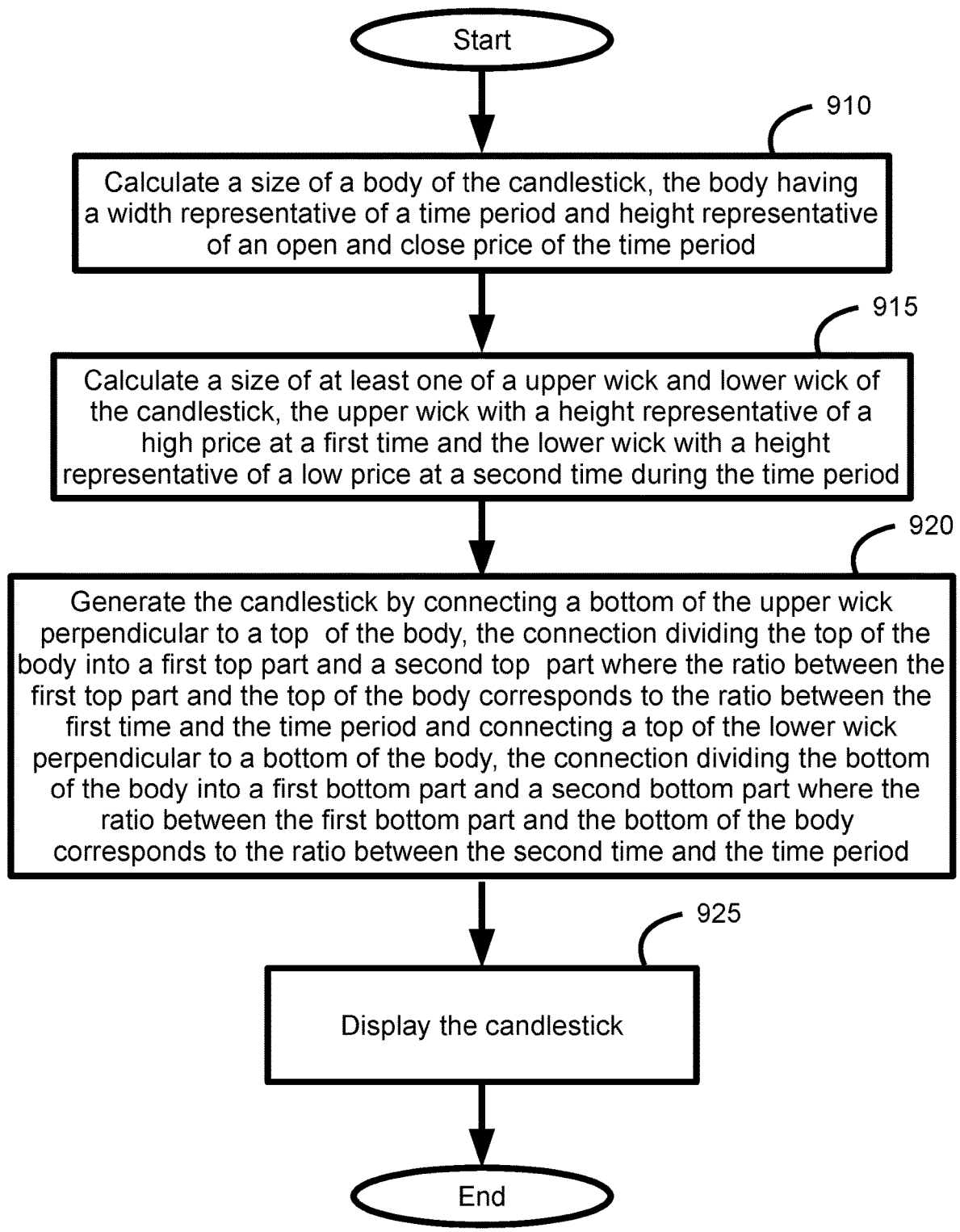
FIG. 9 is a flowchart illustrating the steps performed for generating and displaying a candlestick in accordance with the present invention.

FIG. 9 is a flowchart illustrating the steps performed for generating and displaying a candlestick in accordance with the present invention. When a network access device 210 receives security market data 225 including enhanced OHLC data 810 a device processor 315 in operative communication with a charting engine 340 can calculate in step 910 a size of a body of the candlestick, the body having a width and height where the width is representative of the time period and the height is representative of a range between an open price and a close price during the time period and calculate in step 915 a size of at least one of an upper wick and lower wick of the candlestick, the upper wick having a height representative of a high price at a first time during the time period and the lower wick having a height representative of a low price at a second time during the time period. After such calculations the candlestick can be generated in step 920 by connecting a bottom of the upper wick substantially perpendicular to a top of the body, the connection dividing the top of the body into a first top part and a second top part where the ratio between the first top part and the top of the body corresponds to the ratio between the first time and the time period and by connecting a top of the lower wick substantially perpendicular to a bottom of the body, the connection dividing the bottom of the body into a first bottom part and a second bottom part where the ratio between the first bottom part and the bottom of the body corresponds to the ratio between the second time and the time period, and display in step 925 the candlestick.

Figure 10:
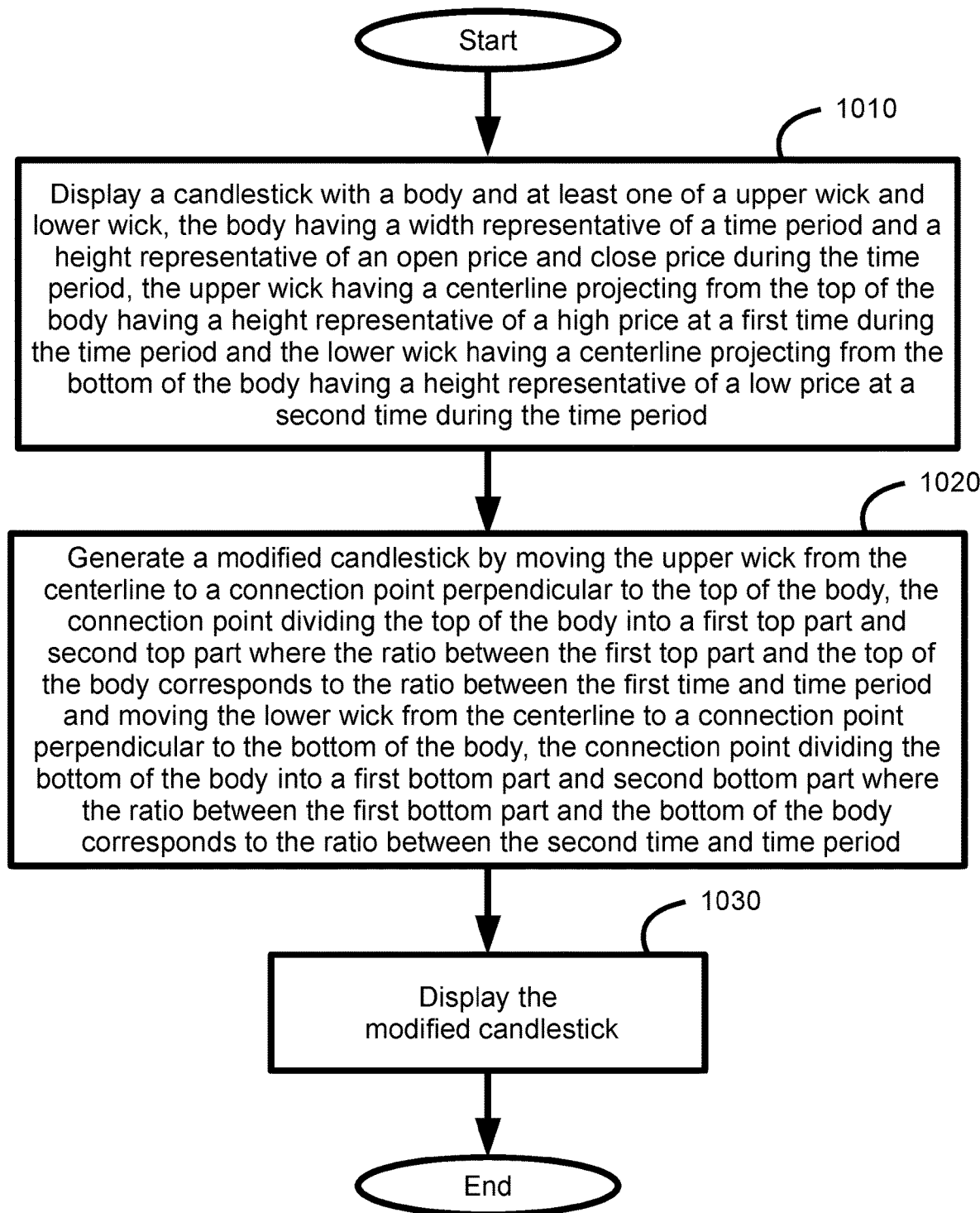
FIG. 10 is a flowchart illustrating the steps performed for generating or modifying the display of a candlestick in accordance with the present invention.

FIG. 10 is a flowchart illustrating the steps performed for modifying the display of a candlestick in accordance with the present invention. When a displayed candlestick is identified in step 1010 with a body and at least one of an upper wick and lower wick, the body having a width representative of a time period and a height representative of a range between an open price and close price during the time period, the upper wick having a centerline projecting from the top of the body having a height representative of a high price at a first time during the time period and the lower wick having a centerline projecting from the bottom of the body having a height representative of a low price at a second time during the time period the modified candlestick can be generated in step 1020 by moving the upper wick from the centerline to a connection point substantially perpendicular to the top of the body, the connection point dividing the top of the body into a first top part and second top part where the ratio between the first top part and the top of the body corresponds to the ratio between the first time and time period and moving the lower wick from the centerline to a connection point substantially perpendicular to the bottom of the body, the connection point dividing the bottom of the body into a first bottom part and second bottom part where the ratio between the first bottom part and the bottom of the body corresponds to the ratio between the second time and time period. The modified candlestick can then be displayed in step 1030.

Unlike conventional candlesticks that display the wick(s) along a centerline vertical axis one hundred percent of the time, the freedom of the instant invention to move the upper and lower wicks along the body of the candlestick would make enhanced candlesticks with wick(s) along a centerline vertical axis rare and could only happen when either or both of the high price and low price occur near or around half of the given time period.

Though it is generally preferred that the wicks are displayed vertical the term substantially perpendicular is used to allow for alternate aspects of the instant invention. The wicks can be adapted to be slightly rotated or tilted forward or backward to indicate price direction or momentum during the time period or near the time of the high price or low price. Further, tilting each wick along the centerline of a conventional candlestick can indicate which of a high price and low price had occurred first during the time period. The degree a tilt or rotational can be proportional to the length of time between the occurrence of the high and low price within the given time period.

There are different types of market data available used to render and display an enhanced candlestick chart such as real time streaming live data when a given market is open and historical data used for research, technical analysis, and backtesting. Enhanced OHLC data 810 will be particularly useful for historical data to enable users to visualize enhanced candlesticks over longer time periods spanning years or decades if need be.

The methods shown above can be employed from points of view of publisher/provider and subscriber/user. For instance, the data provider device 230 of a publisher can receive a request to download an enhanced candlestick chart data feed and send a flash object that includes the enhanced candlestick chart to the network access device 210 of a user or subscriber that can be opened and displayed in a browser or embedded into an electronic document. Further, the network access device 210 could store in memory an enhanced candlestick price chart display applet that runs in a standard Java virtual machine (JVM) executing within a browser or make API calls to receive real time streaming enhanced OHLC data 810 and/or enhanced candlestick chart publishing data from the charting engine of the data provider device. Further API connections 330 can integrate a real time streaming enhanced candlestick chart or OHLC price bar chart module directly with brokerage trading software including trading portfolios, order management systems, and accounting systems.

Such enhanced OHLC data flow can be operatively communicated between publisher/provider and subscriber/user via a Hyper Text Transfer Protocol (HTTP) based query that can utilize a Hyper Text Markup Language (HTML), an eXtensible Markup Language (XML), Dynamic-HTML (DHTML), Asynchronous JavaScript and XML (AJAX), JavaScript, Applets, or some other suitable communication protocol or content format. Further open source charting libraries such as Chart.js, Chartist.js, D3.js, Google Charts, n3-charts, and the like can be modified with newly integrated function calls to be used for the dynamic generation and rendering of OHLC and HLC type symbols discussed in the instant invention throughout. In one embodiment, a cloud server can serve as a publisher platform for a Charting as a Service (CaaS) for subscribers to gain access to such new enhanced price charts that can further be integrated into interfaces of trading software and systems for market participants.

Due to the expanded visual symbol set of unique enhanced candlesticks, a chart pattern recognition and analysis module 355 can be applied upon enhanced candlestick, OHLC price bar, or HLC price bar sequences of varying pattern length and use Artificial Intelligence type (AI) deterministic algorithms including machine learning algorithms, Bayesian networks, neural networks, or fuzzy systems. In some embodiments, any number of stochastic algorithms may be implemented including: genetic algorithms or Monte Carlo algorithms. By applying such methods, greater insight can be revealed as to the greater likelihood of the next type of enhanced candlestick or price bar that could occur in a current unfolding sequence or progression of emerging enhanced candlestick patterns.

The present invention includes dynamically generating and displaying a widening candlestick by repetitively displaying a current vertical line from a OHLC data of a current intratime period adjacent (to the right) to all prior displayed generated vertical lines of all prior intratime periods and repetitively generating a current body and at least one of a current upper wick and lower wick wherein the width of the current body is equal to the sum of the width of the current intratime period and each width of all the prior intratime periods and further includes generating and displaying a final candlestick having a final body and at least one of a final upper wick and lower wick wherein the width of the final body is equal to the width of the time period. The invention can further include generating OHLC data in real time after each intratime period from time/sales data streamed during the intratime period and determining from configuration settings 335 whether at least one of an upper and lower wick is displayed at either the start, middle, or end of the width of the body for each intratime period or time period. A time period can range from a fraction of a second to decades.

All the techniques of using the width of a candle body as an intratime axis to proportionately shift the display of upper and lower wicks as well as the dynamic generation techniques of widening the candle body for each intratime period can be applied to HLC and OHLC price bars and charts as well.

FIG. 11-A is an illustration of an enhanced HLC price bar that can be generated in accordance with the present invention. The illustration visually compares the prior art of FIG. 1-A, where an OHLC bar has a single vertical line 110 that shows the high price 114 and the low price 118 of a time period with the open price 122 marked by a tick mark on the left of the vertical line 110, and the close price 126 marked by a tick mark on the right of the vertical line 110. This prior art chart is of a price axis only for a discrete interval of time during a time period. Rather than using the vertical line centric to showing OHLC it can be appreciated that the new HLC price bar 1100 of the instant invention splits the vertical high-low price line into two separate vertical lines of a high price bar 1110 and a low price bar 1115 both of which connect and centric to a horizontal close price bar 1120 the length of which serving as an intratime axis for the time period so that a user viewing this new HLC bar can ascertain when the high price bar 1110 and low price bar 1115 have respectively occurred during the time period. Optionally a tick mark for an open price (not shown) could be drawn in this case to the left of the low price bar 1115 and turn the enhanced HLC price bar 1100 into an enhanced OHLC price bar.

FIG. 11-B is an illustration of enhanced OHLC price bars that can be generated in accordance with the present invention. A similar technique that was applied toward enhancing and changing the function of HLC price bars can also be applied toward enhancing OHLC price bars (1130,1160). The new OHLC price bar 1130 of the instant invention splits the vertical high-low price line into two separate vertical lines of a high price bar 1140 and a low price bar 1145 both of which connect and centric to a new open-close price bar 1150 the length of which serving as an intratime axis for the time period so that a user viewing this new OHLC bar can ascertain when the high price bar 1140 and low price bar 1145 have respectively occurred during the time period. The open-close price bar 1150 is drawn as a rising diagonal in this case. This diagonal bar would be the same length and angle as if it served as a diagonal of a candle body (not shown) representative of the height between the open price and close price and the width of the time period. Another new OHLC price bar 1160 also splits the vertical high-low price line into two separate vertical lines of a high price bar 1170 and a low price bar 1175, in this case the high connects perpendicular to a horizontal close price bar 1180 and the low price bar 1175 connects perpendicular to a horizontal open price bar 1185. An additional connecting bar 1190 could be optionally drawn to connect the intersection of the low-open price bars (1175, 1185) with the high-close price bars (1170, 1180). The connecting bar 1190 illustrates the overall price flow during the time period in between high and low price events. Essentially the present invention includes drawing a line between the open-high perpendicular connection and the low-close perpendicular connection if the low price occurred after the high price and drawing a line between the open-low perpendicular connection and the high-close perpendicular connection if the low price occurred before the high price.

Figure 12:
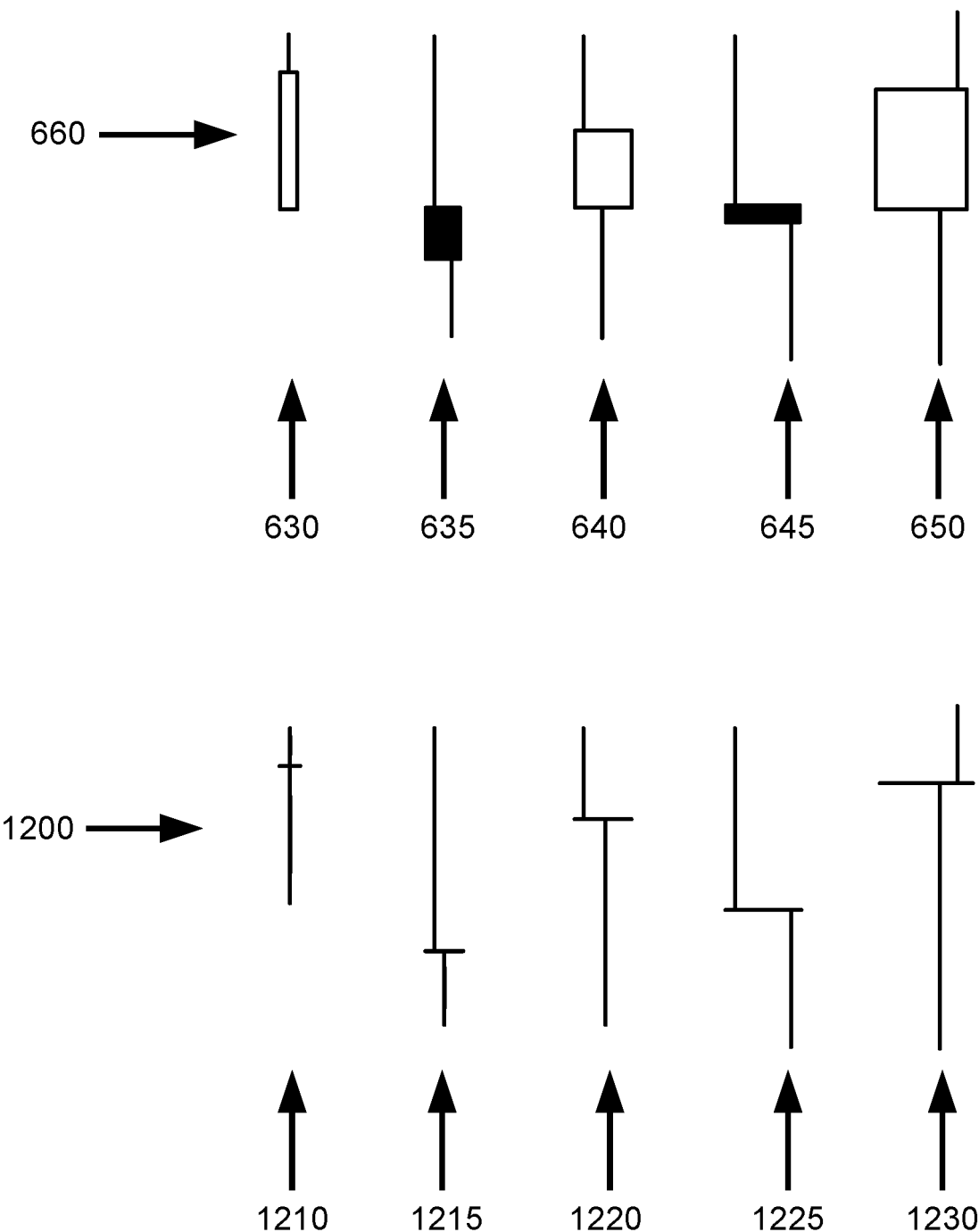
FIG. 12 is an illustration of enhanced OHLC price bars that can be dynamically generated in accordance with the present invention.

FIG. 12 is an illustration of enhanced OHLC price bars that can be dynamically generated in accordance with the present invention. Similar to how row 660 of FIG. 6, shows the progression of each intratime period (630, 635, 640, 645, 650) where the width of the candlestick widens as wide as the width of the current and prior intratime periods during the entire time period, such to does row 1200 show the progression of each intratime period (1210, 1215, 1220, 1225, 1230) of enhanced HLC price bars where the width of the horizontal close bar progressively widens during the time period giving a user a visual sense of how much time has passed during the time period. The other exemplary distinction in accordance with the present invention is that the widening horizontal close bar shows more accurately when the high price or low price has occurred based on rendering the upper price bar in the highest known intratime period and the lower price bar in the lowest known intratime period. By modifying where the vertical price bars are positioned along the horizontal close bar provides more specific information as to when a high and low price have occurred during the time period without adding any additional graphic information. Such generation techniques can also apply to real time dynamic generation of enhanced OHLC price bars (1130, 1160). For instance, the size and angle of the open-close price bar 1150 can dynamically change in relation to the difference between open price and close price for each intratime period during the time period.

FIG. 13-A is an illustration of alternate enhanced candlesticks that can be generated in accordance with the present invention. Though it has been shown a best mode for carrying out the instant invention with candlesticks are to use the width of the candle body as an intratime axis of a time period to more precisely break up the single centerline wick into an upper wick and lower wick that can be shifted along the candle body, that level of detail or granularity might not be needed particularly in the case of sparse computing resources. In this case, alternate candlesticks can also visually depict which came first, the high price or the low price in a given time period. Alternate enhanced candlestick 1310 shows how only the upper wick is shifted to the right which is enough to signify that the low price came first. Alternate enhanced candlestick 1315 shows how only the upper wick is tilted/rotated to the right which is enough to signify that the low price came first. Alternate enhanced candlestick 1320 shows how the centerline wick that represents both the depiction of an upper wick and lower wick is shifted clockwise can visually signify to the user that the low price came first. It of course would be apparent that shifting the centerline counter-clockwise would signify that the high price came first (not shown).

FIG. 13-B is an illustration of alternate enhanced OHLC price bars that can be generated in accordance with the present invention. Though it has been shown a best mode for carrying out the instant invention with OHLC price bars are to use the width of a price bar spanning from the open price to close price as an intratime axis of a time period to more precisely break up the single centerline high-low price bar into an upper price bar and lower price bar that can be shifted along the open-close price bar, that level of detail or granularity might not be needed particularly in the case of sparse computing resources. In this case, alternate OHLC price bars can also visually depict which came first, the high price or the low price in a given time period. Alternate enhanced OHLC price bar 1330 shows how only the upper price bar representative of the high price is shifted to the right which is enough to signify that the low price came first. Alternate enhanced OHLC price bar 1335 shows how only the upper price bar is tilted/rotated to the right which is enough to signify that the low price came first. Alternate enhanced OHLC price bar 1340 shows how the centerline high-low price bar is shifted clockwise which can visually signify to the user that the low price came first. It of course would be apparent that shifting the centerline counter-clockwise would signify that the high price came first (not shown).

Figure 14:
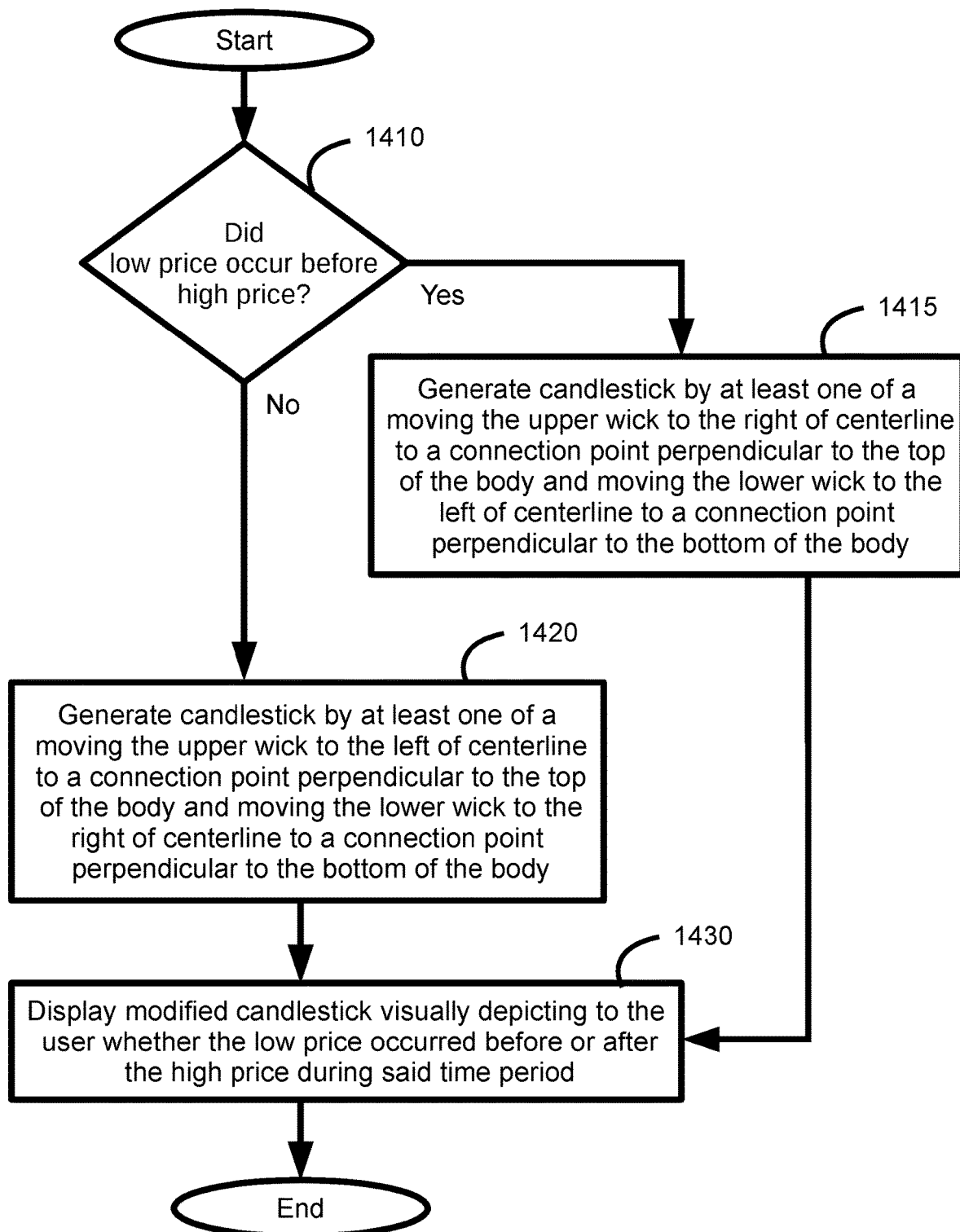
FIG. 14 is a flowchart illustrating the steps performed for generating or modifying the display of a candlestick in accordance with the present invention.

FIG. 14 is a flowchart illustrating the steps performed for generating or modifying the display of a candlestick in accordance with the present invention. When a candlestick is identified with a body and at least one of an upper wick and lower wick, the body having a width representative of a time period and a height representative of a range between an open price and close price during the time period, the upper wick having a centerline projecting from the top of the body having a height representative of a high price at a first time during the time period and the lower wick having a centerline projecting from the bottom of the body having a height representative of a low price at a second time during the time period it can be determined in step 1410 whether the low price occurred before the high price during the time period. If the low price did occur first then the candlestick can be modified or generated in step 1415 by at least one of a moving the upper wick to the right of centerline to a connection point perpendicular to the top of the body and moving the lower wick to the left of centerline to a connection point perpendicular to the bottom of the body. However, if the high price occurred first then the candlestick can be modified or generated in step 1420 by at least one of a moving the upper wick to the left of centerline to a connection point perpendicular to the top of the body and moving the lower wick to the right of centerline to a connection point perpendicular to the bottom of the body. In either case, the charting engine can then display in step 1430 the modified candlestick (e.g., 1310) visually depicting to the user whether the low price occurred before or after the high price during the time period.

Figure 15:
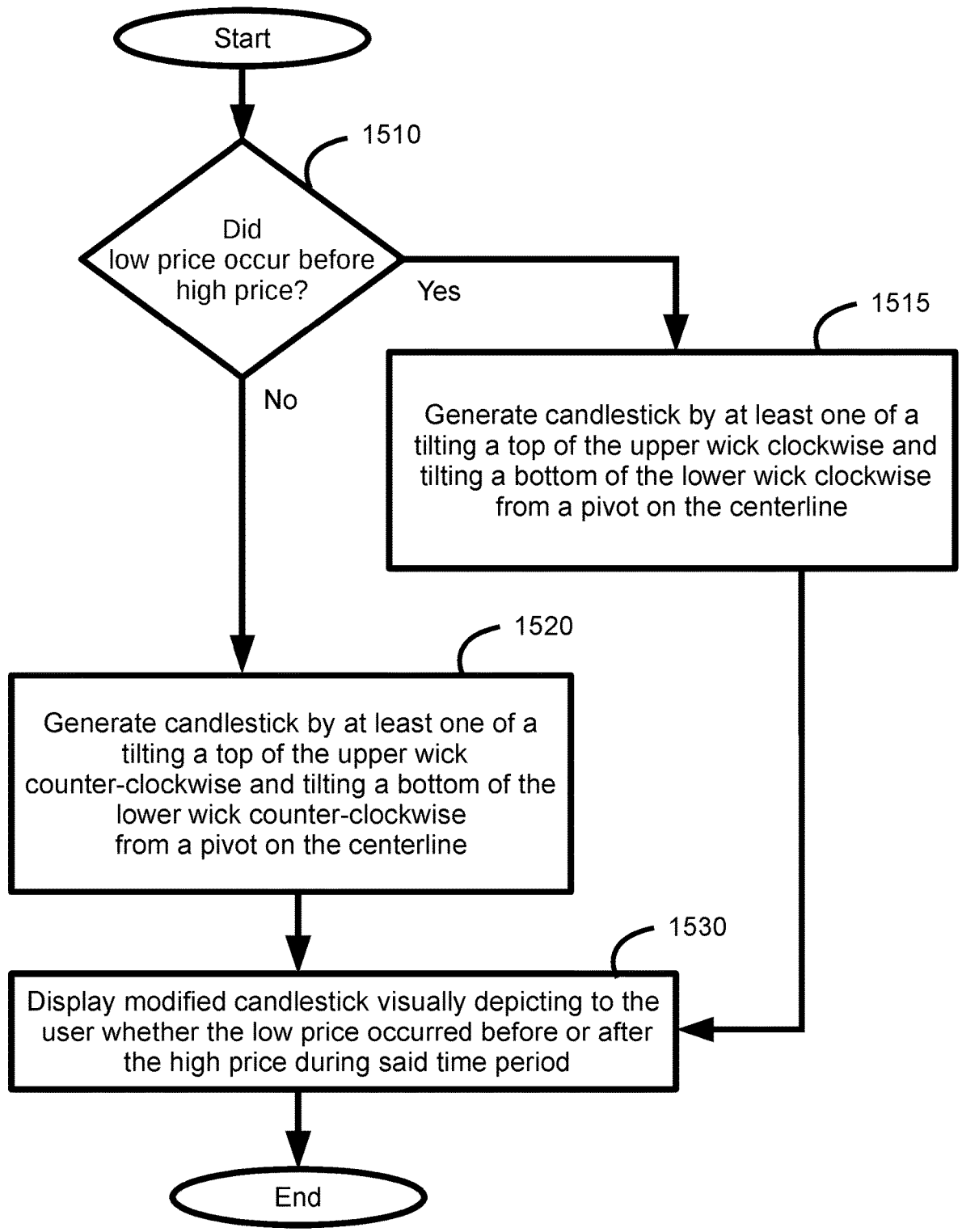
FIG. 15 is a flowchart illustrating the steps performed for generating or modifying the display of a candlestick in accordance with the present invention.

FIG. 15 is a flowchart illustrating the steps performed for generating or modifying the display of a candlestick in accordance with the present invention. When a candlestick is identified with a body and at least one of an upper wick and lower wick, the body having a width representative of a time period and a height representative of a range between an open price and close price during the time period, the upper wick having a centerline projecting from the top of the body having a height representative of a high price at a first time during the time period and the lower wick having a centerline projecting from the bottom of the body having a height representative of a low price at a second time during the time period it can be determined in step 1510 whether the low price occurred before the high price during the time period. If the low price did occur first then the candlestick can be modified or generated in step 1515 by at least one of a tilting a top of the upper wick clockwise and tilting a bottom of the lower wick clockwise from a pivot on the centerline. However, if the high price occurred first then the candlestick can be modified or generated in step 1520 by at least one of a tilting a top of the upper wick counter-clockwise and tilting a bottom of the lower wick counter-clockwise from a pivot on the centerline. In either case, the charting engine can then display in step 1530 the modified candlestick (e.g., 1315,1320) visually depicting to the user whether the low price occurred before or after the high price during the time period.

Figure 16:
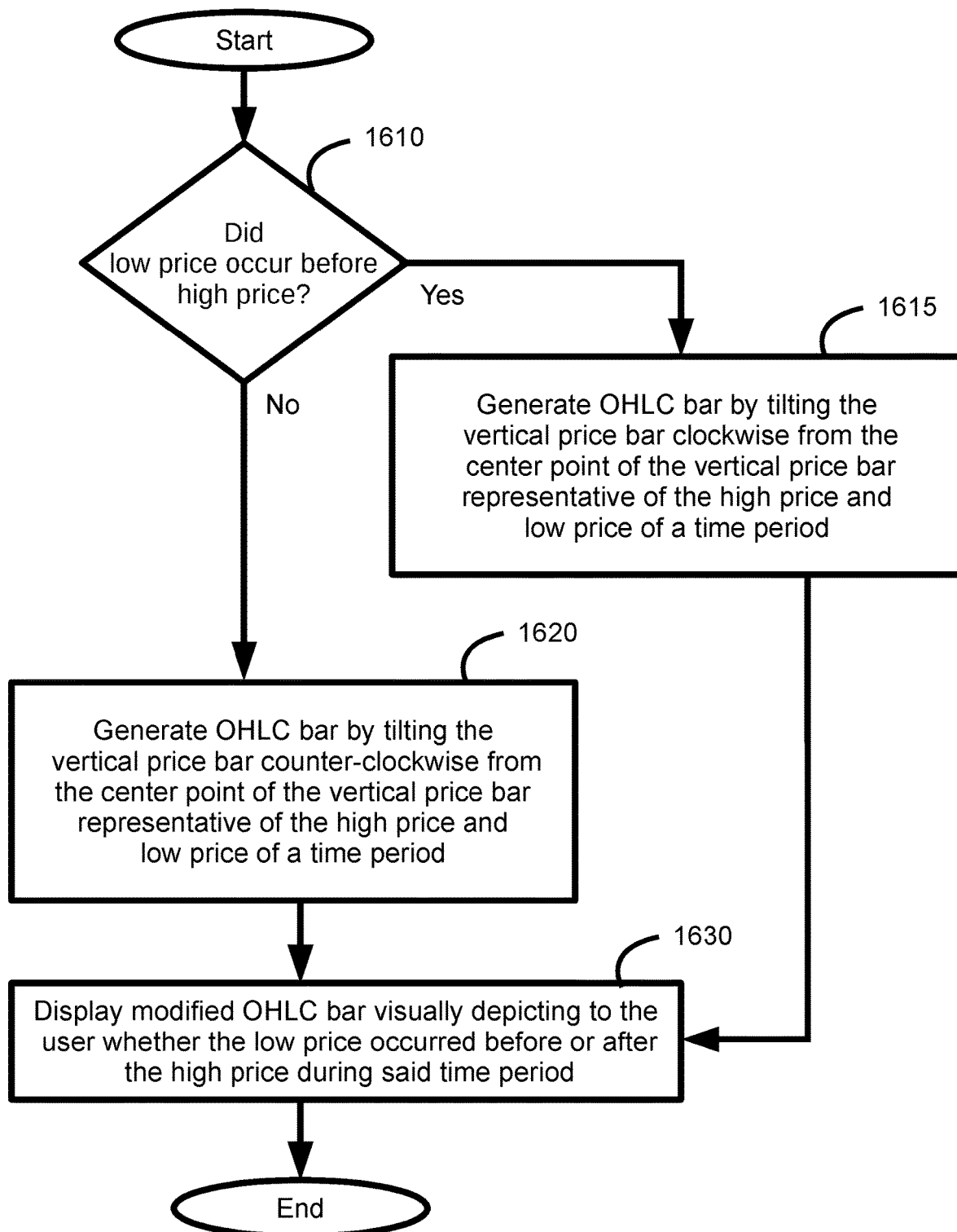
FIG. 16 is a flowchart illustrating the steps performed for generating or modifying the display of a OHLC price bar in accordance with the present invention.

FIG. 16 is a flowchart illustrating the steps performed for generating or modifying the display of a OHLC price bar in accordance with the present invention. When a OHLC price bar is identified with a vertical price bar having a center point and a height representative of a range between a high price and low price during the time period it can be determined in step 1610 whether the low price occurred before the high price during the time period. If the low price did occur first then the OHLC price bar can be modified or generated in step 1615 by by tilting the vertical price bar clockwise from the center point of the vertical price bar. However, if the high price occurred first then the OHLC price bar can be modified or generated in step 1620 by tilting the vertical price bar counter-clockwise from the center point of the vertical price bar. In either case, the charting engine can then display in step 1630 the modified OHLC price bar (e.g., 1130,1340) visually depicting to the user whether the low price occurred before or after the high price during the time period.

Figure 17:
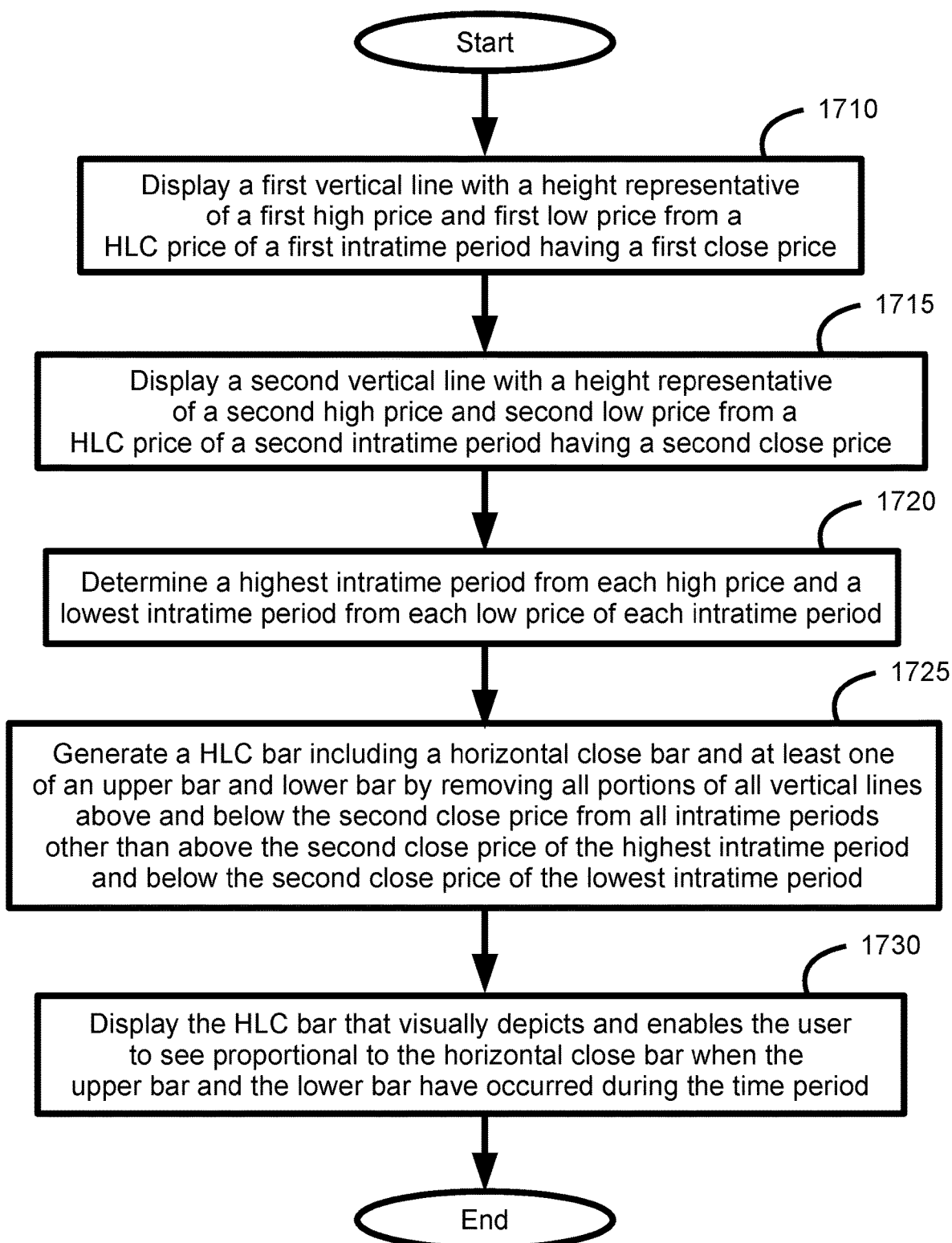
FIG. 17 is a flowchart illustrating the steps performed for generating and displaying a HLC price bar in accordance with the present invention.

FIG. 17 is a flowchart illustrating the steps performed for generating and displaying a HLC price bar in accordance with the present invention. When a network access device 210 receives security market data 225 including OHLC data 350 (or HLC data only if OHLC data is not available), a device processor 315 in operative communication with a charting engine 340 can generate and display in step 1710 a first vertical line with a height representative of a range between a first high price and first low price from the OHLC data of a first intratime period and then generate and display in step 1715 a second vertical line with a height representative of a range between a second high price and second low price from a OHLC data of a second intratime period.

A highest intratime period from each high price and a lowest intratime period from each low price of each intratime period can be determined in step 1720 and a HLC bar can be generated in step 1725 including a horizontal close bar and at least one of an upper bar and lower bar by removing all portions of all vertical lines above and below the second close price from all intratime periods other than above the second close price of the highest intratime period and below the second close price of the lowest intratime period. The HLC bar can then be displayed in step 1730 by the charting engine 340, the HLC bar visually depicting and enabling the user to see proportional to the horizontal close bar when the upper bar and the lower bar have occurred during the time period.

Figure 18:
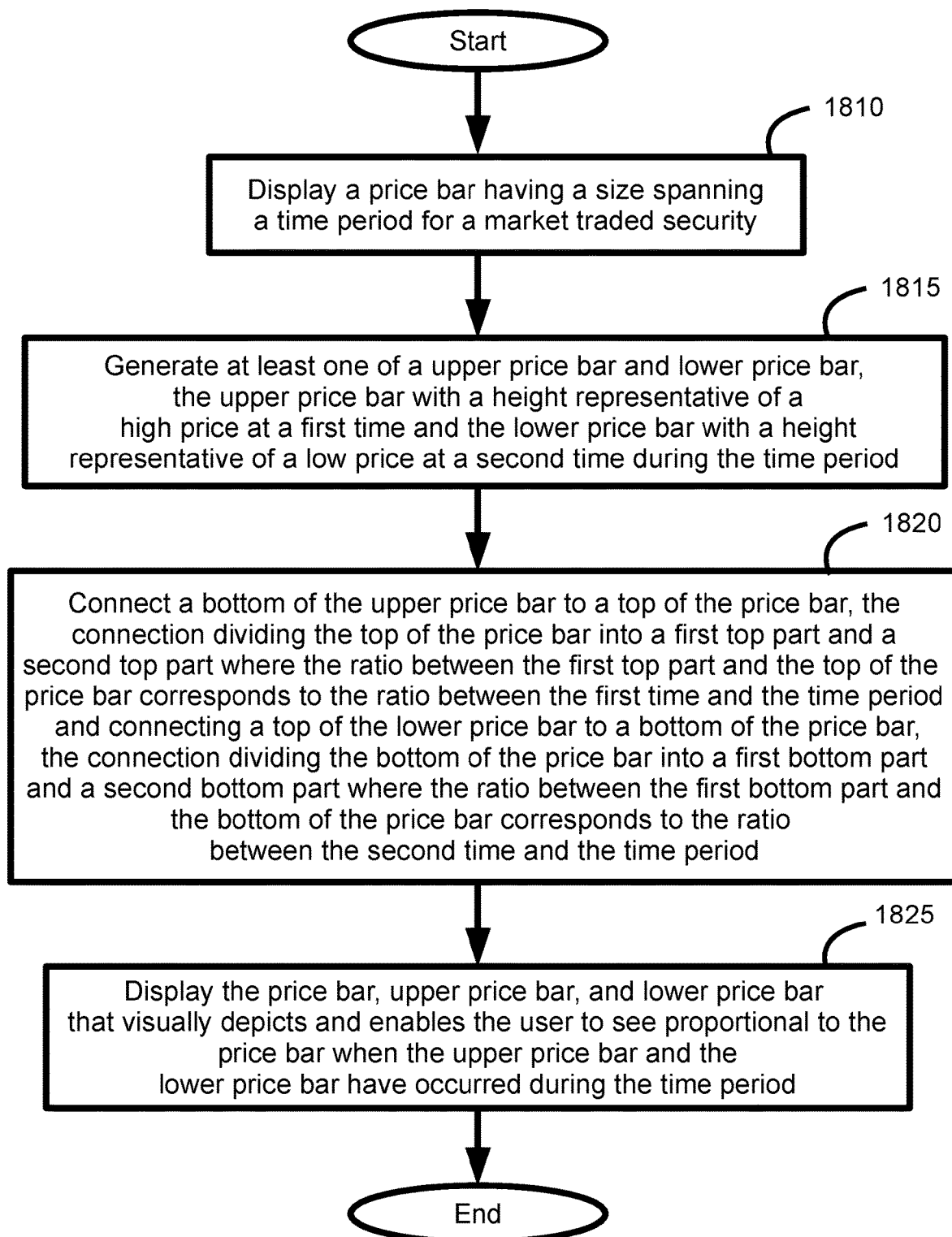
FIG. 18 is a flowchart illustrating the steps performed for generating and displaying an OHLC type of price bar in accordance with the present invention.

FIG. 18 is a flowchart illustrating the steps performed for generating and displaying an OHLC type of price bar in accordance with the present invention. When a network access device 210 receives security market data 225 including OHLC data 350, a device processor 315 in operative communication with a charting engine 340 can generate and display in step 1810 a price bar having a size spanning a time period for a market traded security and generate in step 1815 at least one of an upper bar and lower bar, the upper bar with a height representative of a high price at a first time and the lower bar with a height representative of a low price at a second time during the time period.

The upper bar and lower price bar can then be connected in step 1820 to the price bar by connecting a bottom of the upper bar to a top of the price bar, the connection dividing the top of the price bar into a first top part and a second top part where the ratio between the first top part and the top of the price bar corresponds to the ratio between the first time and the time period and connecting a top of the lower bar to a bottom of the price bar, the connection dividing the bottom of the price bar into a first bottom part and a second bottom part where the ratio between the first bottom part and the bottom of the price bar corresponds to the ratio between the second time and the time period. The price bar, upper bar, and lower bar can then be displayed in step 1825 that visually depicts and enables the user to see proportional to the price bar when the upper bar and the lower bar have occurred during the time period.

The price bar is representative of one of a close price, last price, open price, open-close price, and average price. The average price can be one of a simple moving average (SMA), exponential moving average (EMA), VWAP (Volume Weighted Average Price), TWAP (Time Weighted Average Price), mean price, median price, ATR (Average True Range) price and the like. The price bar is not vertical, for instance a price bar representing only a close price would be horizontal and a price bar representative of line drawn from an open price to a different close price would be diagonal. Such diagonal could be the equivalent of the same diagonal inside a body of the candle (if displayed) representing the same OHLC time period. The upper price bar and lower price bar are substantially vertical. The price bar, upper price bar, and lower price bar together visually depict to a user one of an enhanced HLC (high, low, close) bar and an enhanced OHLC (open, high, low, close) bar which can also be a current enhanced bar displayed adjacent to one or more previously displayed enhanced bars to form one of an enhanced HLC price chart and OHLC price chart. The enhanced HLC bar and enhanced OHLC bar can be rendered as one of a scalable vector graphic (SVG) and Canvas generated image. The price bar can also take the form of a body of a candle where the upper price bar is an upper wick and lower price bar is a lower wick that together visually depict to a user an enhanced candlestick which can be displayed adjacent to one or more previously displayed enhanced candlesticks to form an enhanced candlestick price chart. The enhanced candlestick can be rendered as one of a scalable vector graphic (SVG) and Canvas generated image with HTML and JavaScript using some commands such as rect( ), fillRect( ), strokeRect( ), clearRect( ), moveTo( ), lineTo( ), stroke( ), and fill( ), for example. The price bar can be a line drawn from the open price to the close price across the time period. The correspondence of the ratio between the first top part and the top of the price bar to the ratio between the first time and the time period is substantially equal. The charting engine can be in operative communication with at least one of a server device, client device, cloud device, and peer device.

Figure 19:
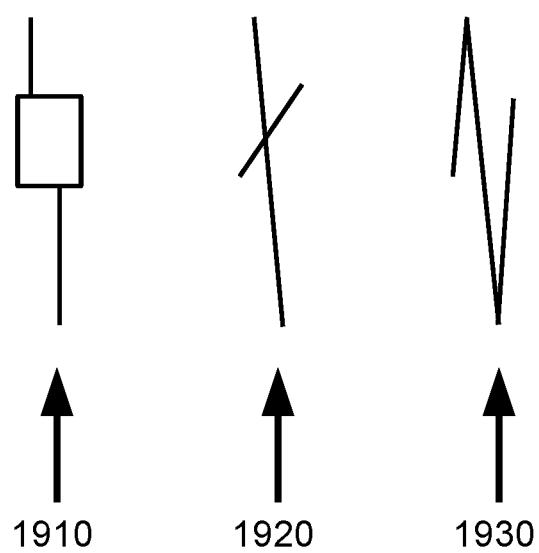
FIG. 19 is an illustration of enhanced OHLC price symbols that can be generated in accordance with the present invention.

FIG. 19 is an illustration of enhanced OHLC price symbols that can be generated in accordance with the present invention. Though it has been shown a preferred mode for carrying out the instant invention with OHLC price bars are to use the width of a price bar spanning from the open price to close price as an intratime axis of a time period to more precisely break up the single centerline high-low price bar into an upper price bar and lower price bar that can be shifted along the open-close price bar, there alternate OHLC price symbols that can also visually depict which came first, the high price or the low price in a given time period. An enhanced candlestick 1910 including a shifted upper and lower wick to represent when the respective high price and low price occurred during a time period as already presented can be used as reference to the generation of new alternate OHLC price symbols. For instance, the two intersecting lines symbol 1920 represent the intersection of an open-close price line and a high-low price line. By superimposing the two intersecting lines over the enhanced candlestick 1910 one would see that the open-close price line would be the diagonal of the candle body drawn from lower left to upper right and that the high-low price line would connect the top of the upper wick to the bottom of the lower wick.

When an open price is lower than the close price the open-close price line would appear rotated counter-clockwise from a horizontal axis at an angle proportionate to the price difference between the close and open price. When an open price is higher than the close price the open-close price line would appear rotated clockwise from a horizontal axis at an angle proportionate to the price difference between the open and close price. Similarly, when a high price occurs before the low price the high-low price line would appear rotated counter-clockwise from a vertical axis at an angle proportionate to the price difference between the high and low price. When the high price occurs after the low price the high-low price line would appear rotated clockwise from a vertical axis at an angle proportionate to the price difference between the high and low price.

When a high price occurs before the low price in a time period, the three contiguous connected lines 1930 can depict the sequence of OHLC with a first price line connecting the open price to the high price, the second line connecting the high price to the low price and the third line connecting the low price to the close price. By superimposing the three contiguous connected lines over the enhanced candlestick 1910 one would see these lines match up to the open price, high price, low price, and close price respectively. When the high price occurs after the low price in the time period, a OLHC sequence can instead take place with the first price line connecting the open price to the low price, the second line connecting the low price to the high price and the third line connecting the high price to the close price.

Figure 20:
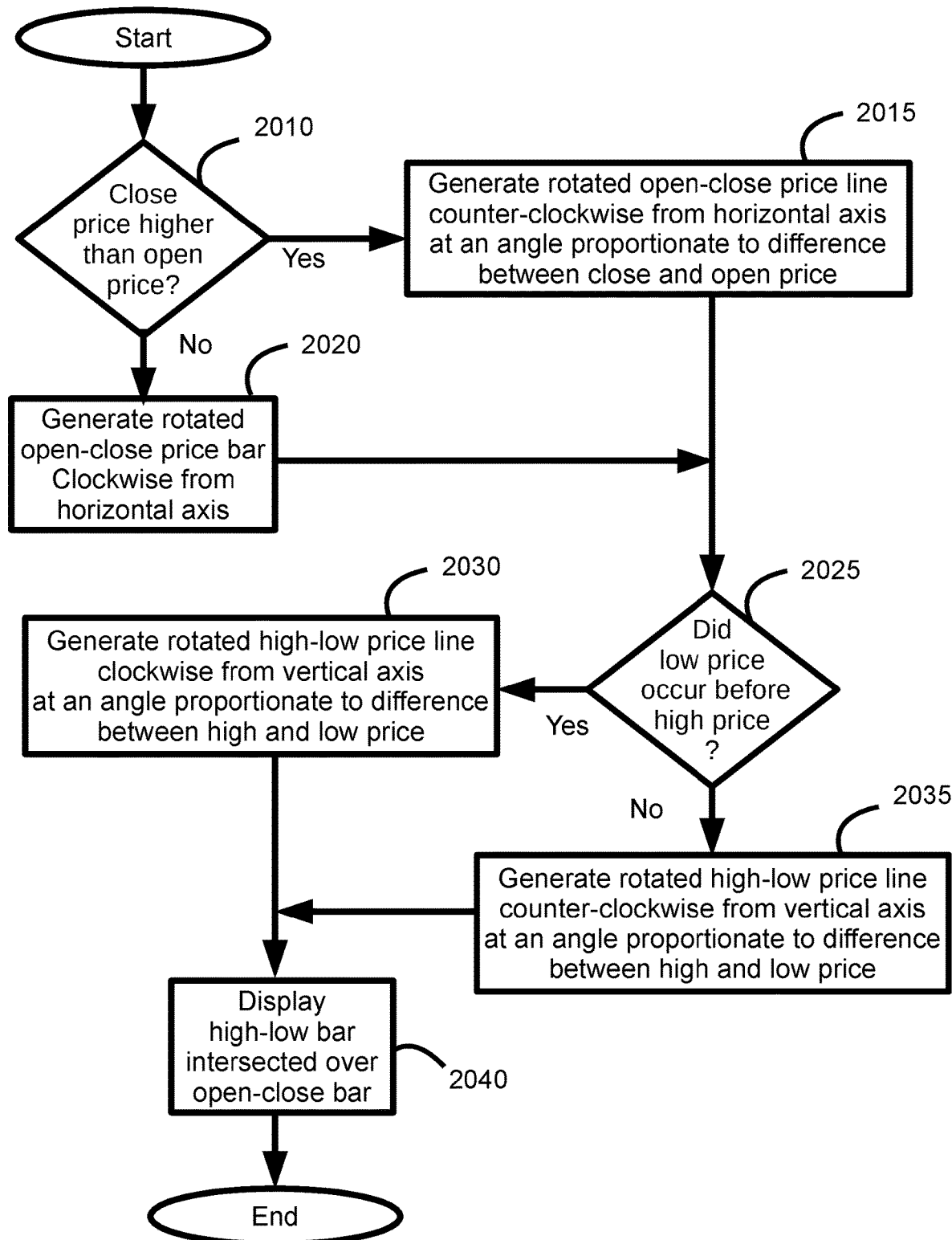
FIG. 20 is a flowchart illustrating the steps performed for generating or displaying an alternate OHLC price symbol in accordance with the present invention.

FIG. 20 is a flowchart illustrating the steps performed for generating or displaying an alternate OHLC price symbol in accordance with the present invention. When a network access device 210 receives security market data 225 including OHLC data 350, a device processor 315 in operative communication with a charting engine 340 can determine in step 2010 whether a close price is higher than the open price for a given time period. If so, an open-close price bar can be generated in step 2015 with a line drawn from an open price to a close price of the time period which is rotated counter-clockwise from a horizontal axis at an angle proportionate to the difference between the close price and open price otherwise the open-close price bar can be generated in step 2020 with a line drawn from the open price to the close price of the time period which is rotated clockwise from a horizontal axis at an angle proportionate to the difference between the close price and open price.

It can then be determined in step 2025 whether the low price occurred before the high price during the time period. If so, a high-low price bar can be generated in step 2030 with a line drawn from the high price at a first time to the low price at a second time for the given time period which is rotated clockwise from a vertical axis at an angle proportionate to difference between the high price and low price otherwise the high-low price bar can be generated in step 2035 with a line drawn from the high price at a first time to the low price at a second time for the given time period which is rotated counter-clockwise from a vertical axis at an angle proportionate to difference between the high price and low price. In either case, the new OHLC price symbol can be displayed in step 2040 where the high-low price bar is intersected over the open-close price bar.

Figure 21:
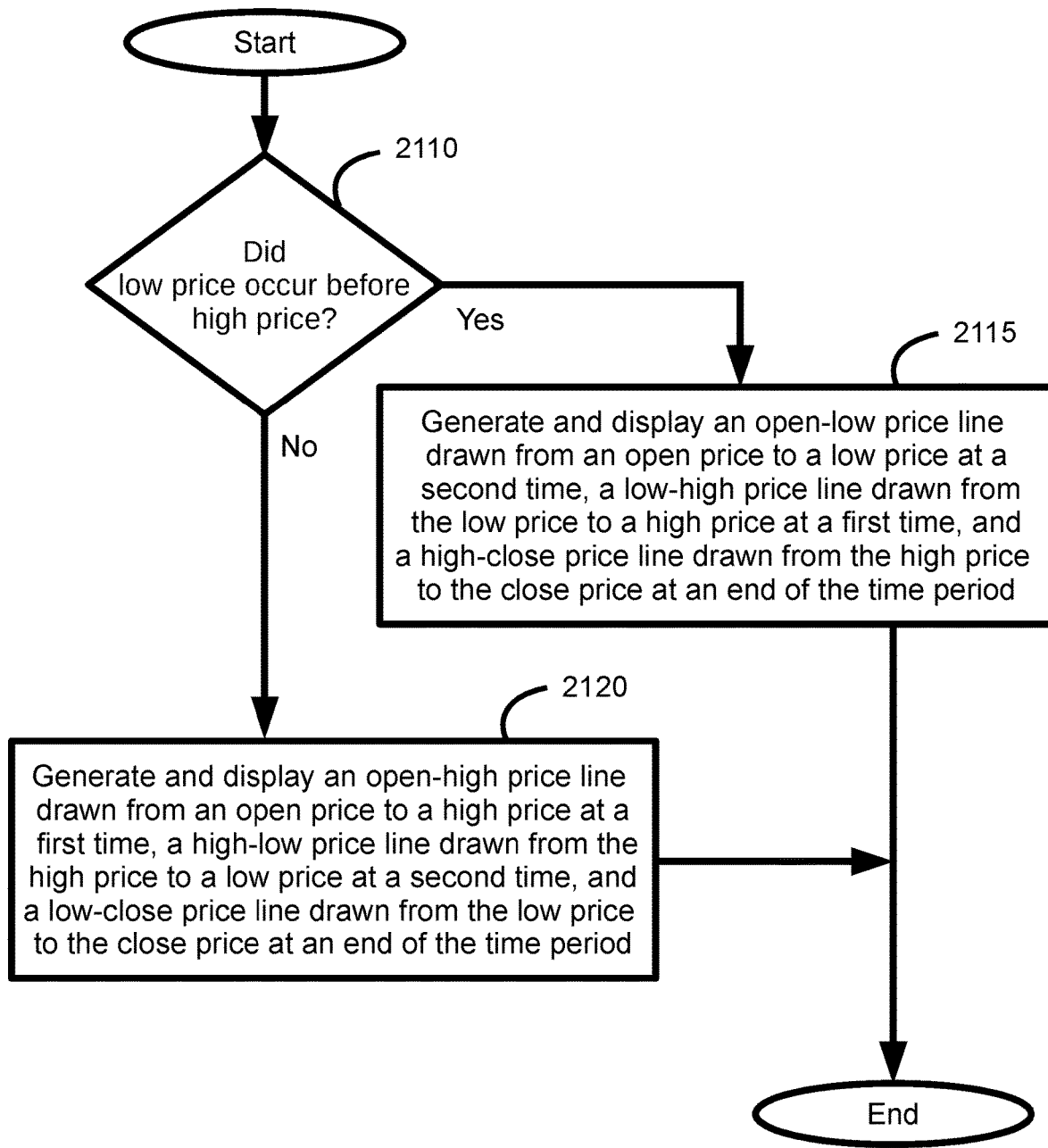
FIG. 21 is a flowchart illustrating the steps performed for generating or displaying another alternate OHLC price symbol in accordance with the present invention.

FIG. 21 is a flowchart illustrating the steps performed for generating or displaying an another alternate OHLC price symbol in accordance with the present invention. When a network access device 210 receives security market data 225 including OHLC data 350, a device processor 315 in operative communication with a charting engine 340 can determine in step 2110 whether the low price occurred before the high price during the time period. If so, the OHLC price symbol can be generated and displayed in step 2115 with an open-low price line drawn from an open price to a low price at a second time, a low-high price line drawn from the low price to a high price, and a high-close price line drawn from the high price to the close price at the end of the time period otherwise the OHLC price symbol can be generated and displayed in step 2120 with an open-high price line drawn from an open price to a high price at a second time, a high-low price line drawn from the high price to a low price, and a low-close price line drawn from the low price to the close price at the end of the time period.

The present invention includes when the close price is a last price during the time period and further includes dynamically generating and displaying a widening open-close price line by repetitively redrawing the open-close price line from the open price to the last price during the time period where the last price is a close price of an intratime period within the time period and the duration of the intratime period can be as small a change in the last price from a previous last price down to a single tick of data.

The present invention also includes when the close price is a last price during the time period and further includes dynamically generating and displaying a widening OHLC price bar by repetitively redrawing the low-close price line from the low price to the last price during the time period if the low price occurred after the high price and redrawing the high-close price line from the high price to the last price during the time period if the low price occurred before the high price.

The present invention can also apply to specific types of candlesticks such as Heikin-Ashi price bars which provide average prices for OHLC based on formulas to smooth noise and visually depict trend. For instance, a close price can represent an average price such as (Open+High+Low+Close)/4 or the high price equal to the maximum of High, Open, or Close or the low price equal to the minimum of Low, Open, or Close, and the open price equal to the (Open of previous bar+Close of previous bar)/2.

Such teachings presented in this instant invention can further apply to 3-D price bar charts where moving averages, volume, or volatility can be mapped along a surface of a third dimension for each discrete time period, for example. Further, frequency distribution of highs and lows can also be projected along a third dimension. The invention is not limited to the line based examples shown throughout of different modified candlesticks, price bars, and new OHLC and HLC symbols in the form of intersecting lines, triangles, quadrilaterals, contiguous connecting lines, and the like but can also further include replacing such lines and shapes with arcs, ovals, ellipses, and any other geometric shape that can connect between two or more price points.

Figure 22:
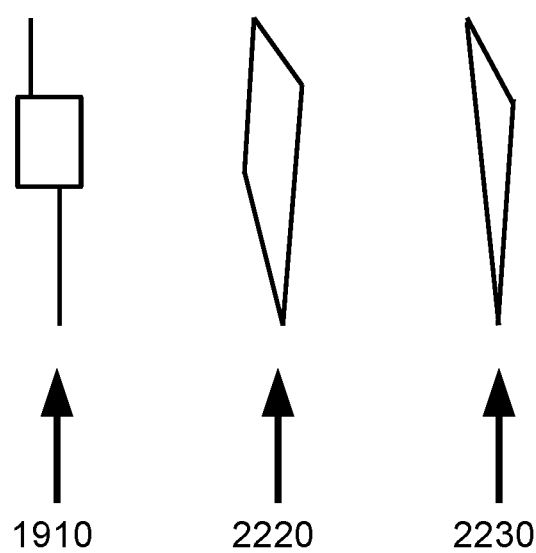
FIG. 22 is an illustration of enhanced OHLC symbol and HLC price symbol that can be generated in accordance with the present invention.

FIG. 22 is an illustration of enhanced OHLC symbol and HLC price symbol that can be generated in accordance with the present invention. There are yet further symbols that can also visually depict which came first, the high price or the low price in a given time period. As previously shown, an enhanced candlestick 1910 including a shifted upper and lower wick to represent when the respective high price and low price occurred during a time period as already presented can be used as reference to the generation of new alternate OHLC and HLC price symbols. For instance, the OHLC price symbol 2220 represents the spatial arrangement in price and time by making the open price, high price at a first time, low price at a second time and close price as vertices of a drawn quadrilateral. Similarly, the HLC price symbol 2230 represents the spatial arrangement in price and time by making the high price at a first time, low price at a second time and close price as vertices of a drawn triangle. By superimposing either symbol (2220, 2230) over the enhanced candlestick 1910 one would see a match in the position of its respective OHLC and HLC price points.

Figure 23:
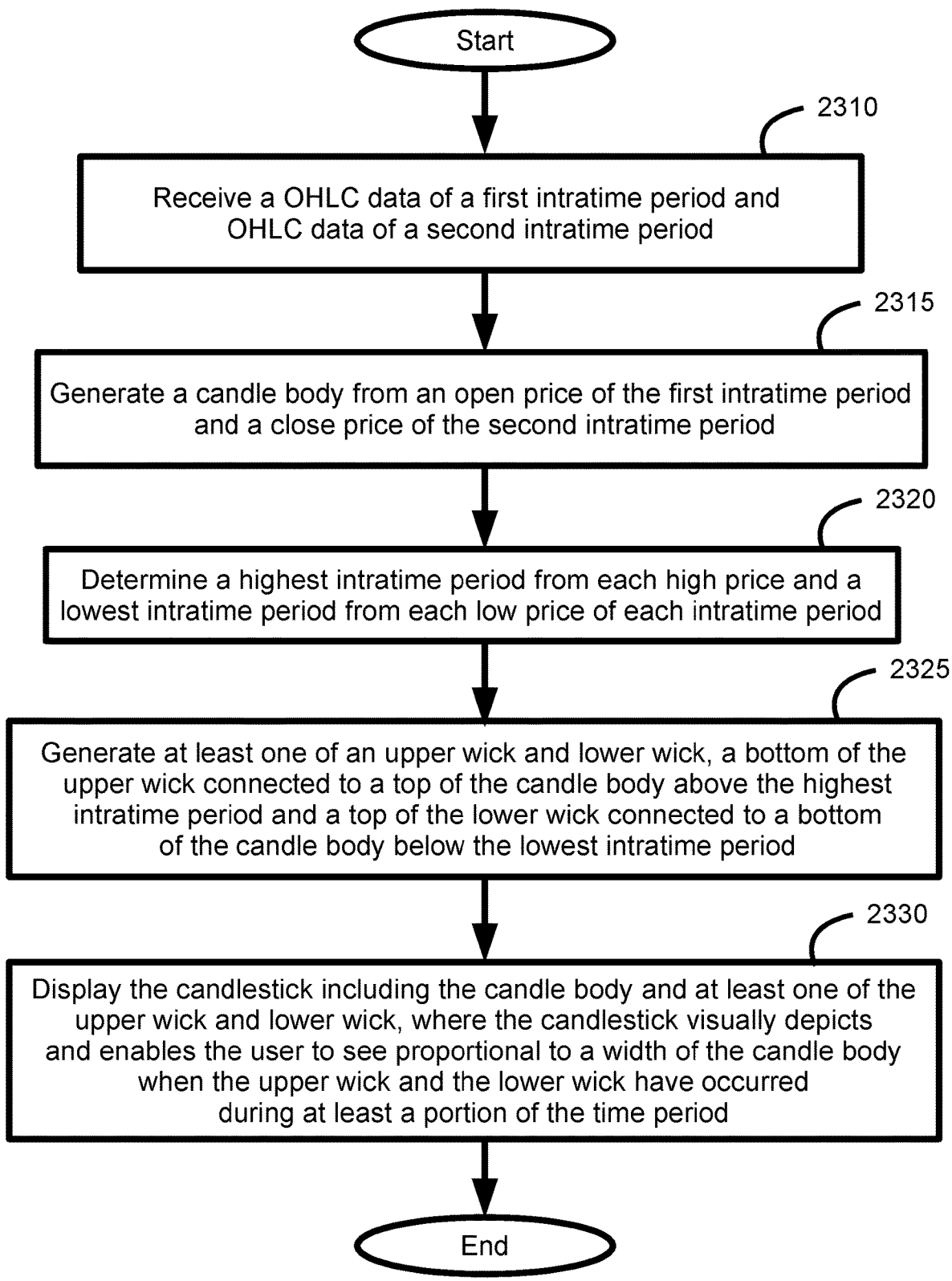
FIG. 23 is a flowchart illustrating the steps performed for generating and displaying a candlestick in accordance with the present invention.

FIG. 23 is a flowchart illustrating the steps performed for generating and displaying a candlestick in accordance with the present invention. Rather than the method of generating a widening candlestick by the successive repetitive drawing of adjacent vertical lines for each intratime period and then erasing portions of lines to form a dynamic candlestick (see FIG. 5), an alternate method can also be used which is to erase a prior drawn candlestick and redraw and replace it with a current candlestick having a wider candle body after each intratime period. When a network access device 210 receives real time security market data 225 including OHLC data 350 (or generate OHLC data from market data in the absence of OHLC data, not shown) a device processor 315 in operative communication with a charting engine 340 can receive and/or generate in step 2310 a OHLC data of a first intratime period and OHLC data of a second intratime period and generate in step 2315 generate a candle body from an open price of the first intratime period and a close price of the second intratime period. A highest intratime period from each high price and a lowest intratime period from each low price of each intratime period can then be determined in step 2320 and at least one of an upper wick and lower wick can be generated in step 2325 where a bottom of the upper wick connects to a top of the candle body above the highest intratime period and a top of the lower wick connects to a bottom of the candle body below the lowest intratime period. The candlestick can then be displayed in step 2330 that includes the candle body and at least one of the upper wick and lower wick, where the candlestick visually depicts and enables the user to see proportional to a width of the candle body when the upper wick and the lower wick have occurred during at least a portion of the time period.

These above steps can be repeated for each intratime period within to dynamically generate and display a widening candlestick after passage of each current intratime period by repetitively erasing the previous drawn candlestick and generating and displaying a current candlestick from a OHLC data of the current intratime period, the current candlestick having a current candle body and at least one of a current upper wick and lower wick where the width of the current candle body is equal to the sum of the width of the current intratime period and each width of all the prior intratime periods. This can continue until the final intratime period of the time period where the current candlestick is erased and a final candlestick is generated and displayed having a final candle body and at least one of a final upper wick and lower wick wherein the width of the final candle body is equal to the width of the time period.

Figure 24:
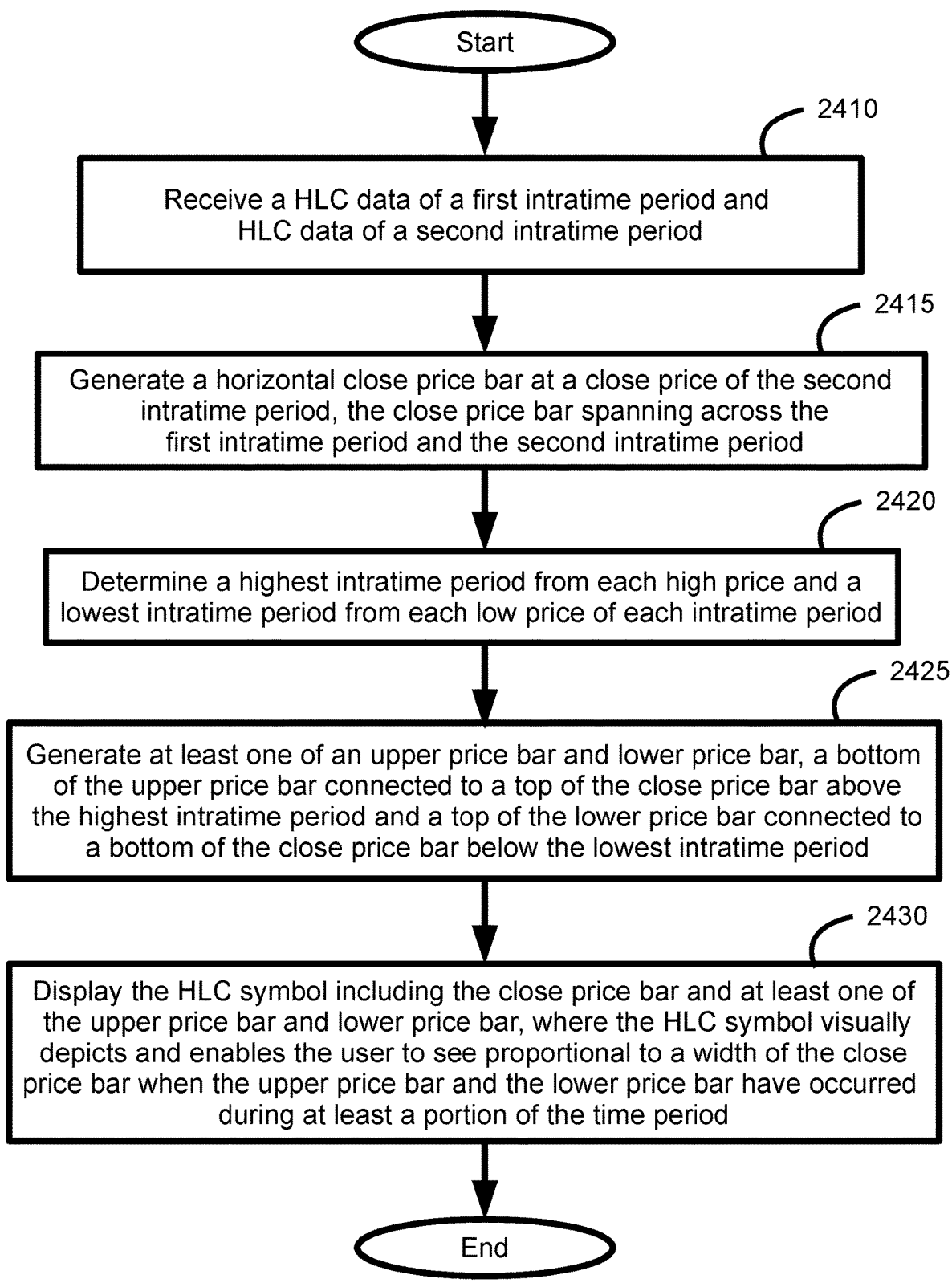
FIG. 24 is a flowchart illustrating the steps performed for generating and displaying a HLC symbol in accordance with the present invention.

FIG. 24 is a flowchart illustrating the steps performed for generating and displaying a HLC symbol in accordance with the present invention. Rather than the method of generating a widening HLC symbol by the successive repetitive drawing of adjacent vertical lines for each intratime period and then erasing portions of lines to form a dynamic HLC symbol (see FIG. 17), an alternate method can also be used which is to erase a prior drawn HLC symbol and redraw and replace it with a current HLC symbol having a wider horizontal close price bar after each intratime period. When a network access device 210 receives real time security market data 225 including HLC data 350 (or generate HLC data from market data in the absence of HLC data, not shown) a device processor 315 in operative communication with a charting engine 340 can receive and/or generate in step 2410 a HLC data of a first intratime period and HLC data of a second intratime period and generate in step 2415 generate a horizontal close price bar at a close price of the second intratime period, the close price bar spanning across the first intratime period and the second intratime period. A highest intratime period from each high price and a lowest intratime period from each low price of each intratime period can then be determined in step 2420 and at least one of an upper price bar and lower price bar can be generated in step 2425 where a bottom of the upper price bar connects to a top of the close price bar above the highest intratime period and a top of the lower price bar connects to a bottom of the close price bar below the lowest intratime period. The HLC symbol can then be displayed in step 2430 that includes the close price bar and at least one of the upper price bar and lower price bar, where the HLC symbol visually depicts and enables the user to see proportional to a width of the close price bar when the upper price bar and the lower price bar have occurred during at least a portion of the time period.

These above steps can be repeated for each intratime period within to dynamically generate and display a widening HLC symbol after passage of each current intratime period by repetitively erasing the previous drawn HLC symbol and generating and displaying a current HLC symbol from a HLC data of the current intratime period, the current HLC symbol having a current close price bar and at least one of a current upper price bar and lower price where the width of the current close price bar is equal to the sum of the width of the current intratime period and each width of all the prior intratime periods. This can continue until the final intratime period of the time period where the current HLC symbol is erased and a final HLC symbol is generated and displayed having a final close price bar and at least one of a final upper price bar and lower price bar where the width of the final close price bar is equal to the width of the time period.

Figure 25:
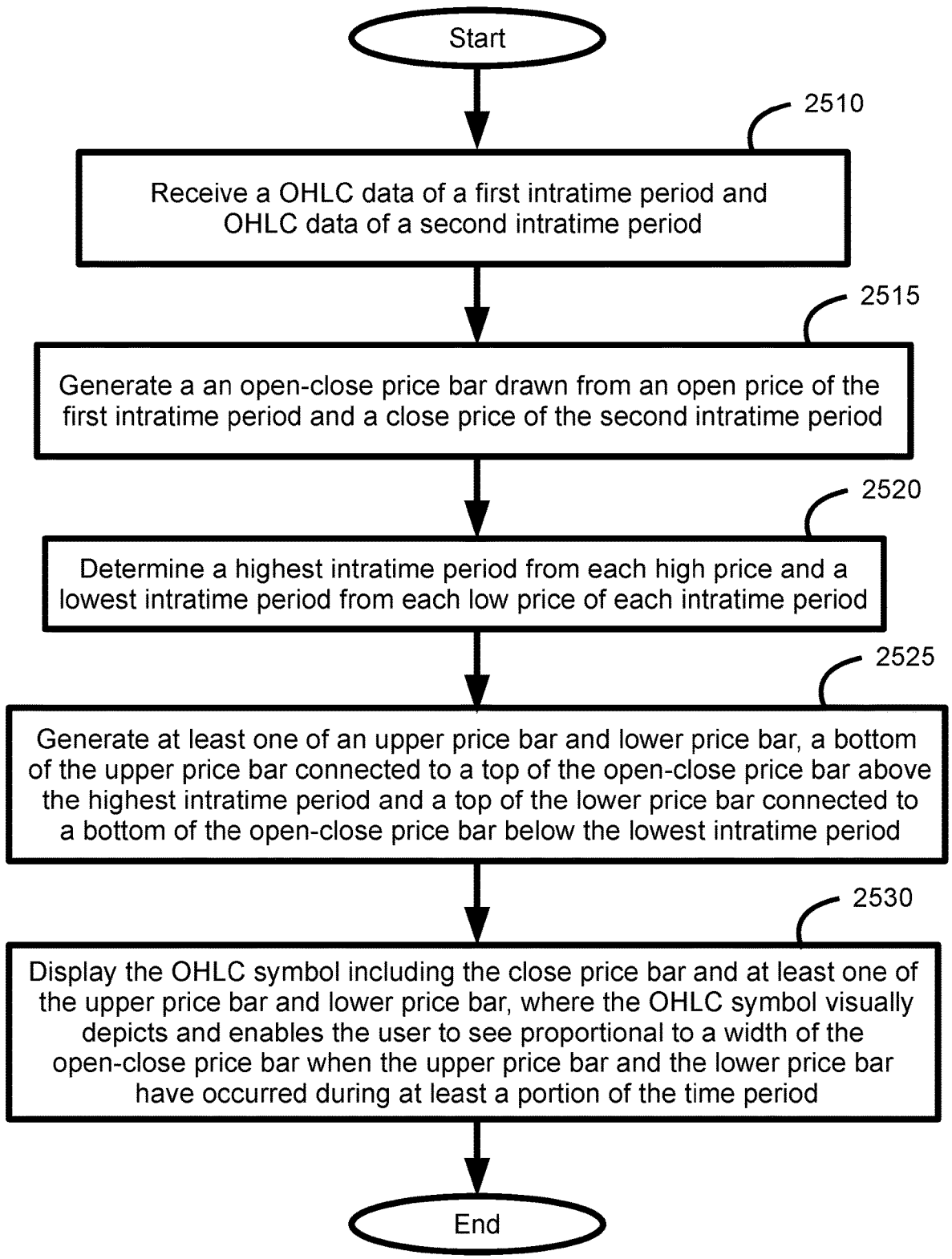
FIG. 25 is a flowchart illustrating the steps performed for generating and displaying a OHLC symbol in accordance with the present invention.

FIG. 25 is a flowchart illustrating the steps performed for generating and displaying a OHLC symbol in accordance with the present invention. Techniques described above (see FIG. 23, FIG. 24) can also be applied to the method of generating a widening OHLC symbol by the successive repetitive drawing of adjacent vertical lines for each intratime period and then erasing portions of lines to form a dynamic OHLC symbol, an alternate method can also be used which is to erase a prior drawn OHLC symbol and redraw and replace it with a current OHLC symbol having a wider open-close price bar after each intratime period. When a network access device 210 receives real time security market data 225 including OHLC data 350 (or generate OHLC data from market data in the absence of OHLC data, not shown) a device processor 315 in operative communication with a charting engine 340 can generate and display in step 2510 a OHLC data of a first intratime period and OHLC data of a second intratime period and generate in step 2515 generate an open-close price bar drawn from an open price of the first intratime period and a close price of the second intratime period. A highest intratime period from each high price and a lowest intratime period from each low price of each intratime period can then be determined in step 2520 and at least one of an upper price bar and lower price bar can be generated in step 2525 where a bottom of the upper price bar connects to a top of the open-close price bar above the highest intratime period and a top of the lower price bar connects to a bottom of the open-close price bar below the lowest intratime period. The OHLC symbol can then be displayed in step 2530 that includes the open-close price bar and at least one of the upper price bar and lower price bar, where the OHLC symbol visually depicts and enables the user to see proportional to a width of the open-close price bar when the upper price bar and the lower price bar have occurred during at least a portion of the time period.

These above steps can be repeated for each intratime period within to dynamically generate and display a widening OHLC symbol after passage of each current intratime period by repetitively erasing the previous drawn OHLC symbol and generating and displaying a current OHLC symbol from a OHLC data of the current intratime period, the current OHLC symbol having a current open-close price bar and at least one of a current upper price bar and lower price where the width of the current open-close price bar is equal to the sum of the width of the current intratime period and each width of all the prior intratime periods. This can continue until the final intratime period of the time period where the current OHLC symbol is erased and a final OHLC symbol is generated and displayed having a final open-close price bar and at least one of a final upper price bar and lower price bar where the width of the final open-close price bar is equal to the width of the time period.

The present invention can also include generating OHLC data and/or HLC data in real time after each intratime period from time/sales data streamed during the intratime period or after each change in last price from time/sales data where the time period can range from a fraction of a second to decades and the intratime period can visually depict price and time as small as in a one pixel wide column of one or more pixels.

Although the invention has been shown and described with respect to a certain preferred aspect or aspects, it is obvious that equivalent alterations and modifications will occur to others skilled in the art upon the reading and understanding of this specification and the annexed drawings. In particular regard to the various functions performed by the above described items referred to by numerals (components, assemblies, devices, compositions, etc.), the terms (including a reference to a "means") used to describe such items are intended to correspond, unless otherwise indicated, to any item which performs the specified function of the described item (e.g., that is functionally equivalent), even though not structurally equivalent to the disclosed structure which performs the function in the herein illustrated exemplary aspect or aspects of the invention. In addition, while a particular feature of the invention may have been described above with respect to only one of several illustrated aspects, such feature may be combined with one or more other features of the other aspects, as may be desired and advantageous for any given or particular application.

The description herein with reference to the figures will be understood to describe the present invention in sufficient detail to enable one skilled in the art to utilize the present invention in a variety of applications and devices. It will be readily apparent that various changes and modifications could be made therein without departing from the spirit and scope of the invention as defined in the following claims.

I claim:

1. A computer-implemented method for displaying, to a user, a candlestick representative of a price range during at least a portion of a time period that includes a plurality of intratime periods, the method comprising:

receiving OHLC (open, high, low, close) data of a first intratime period of the plurality of intratime periods and OHLC data of a second intratime period of the plurality of intratime periods;

a charting engine generating a candle body from an open price of the first intratime period to a close price of the second intratime period;

determining a highest intratime period having a highest price from each high price of each of the first and second intratime periods, and determining a lowest intratime period having a lowest price from each low price of each of the first and second intratime periods;

the charting engine generating at least one of an upper wick and a lower wick, a bottom of the upper wick being connected to a top of the candle body above the determined highest intratime period and a top of the lower wick being connected to a bottom of the candle body below the determined lowest intratime period; and the charting engine displaying the candlestick including the candle body and the at least one of the upper wick and the lower wick, wherein the candlestick visually depicts, and enables the user to see, relative to a width of the candle body, respective times when the highest price and the lowest price occurred during the at least a portion of the time period.

2. The method of claim 1, wherein the candlestick is a prior candlestick and the second intratime period is a prior intratime period, and the method further comprises dynamically generating and displaying a widening candlestick after passage of each current intratime period by repetitively erasing the prior candlestick and generating and displaying a current candlestick from current OHLC data of the current intratime period, the current candlestick having a current candle body and at least one of a current upper wick and a current lower wick, wherein a width of the current candle body is equal to a sum of a width of the current intratime period and each width of all the prior intratime periods.

3. The method of claim 2, further comprising erasing the current candlestick and generating and displaying a final candlestick having a final candle body and at least one of a final upper wick and a final lower wick, wherein a width of the final candle body is equal to a width of the time period.

4. The method of claim 1, further comprising generating the OHLC data in real time after each intratime period of the plurality of intratime periods from time/sales data streamed during the intratime period wherein the time/sales data includes a time and a sales price for each trade of one or more trades.

5. The method of claim 1, further comprising generating the OHLC data in real time from streaming time/sales data after each change in a last price wherein the time/sales data includes a time and a sales price for each trade of one or more trades.

6. The method of claim 1, wherein the time period is from a fraction of a second to decades.

7. The method of claim 1, wherein each intratime period visually depicts price and time in a one pixel-wide column of one or more pixels.

8. A computer-implemented method for displaying, to a user, an HLC (high, low, close) symbol representative of a price range during at least a portion of a time period including a plurality of intratime periods, the method comprising:

receiving HLC data of a first intratime period of the plurality of intratime periods and HLC data of a second intratime period of the plurality of intratime periods;

a charting engine generating a horizontal close price bar at a close price of the second intratime period, the close price bar spanning across the first intratime period and the second intratime period;

determining a highest intratime period having a highest price from each high price of each of the first and second intratime periods, and determining a lowest intratime period having a lowest price from each low price of each of the first and second intratime periods;

the charting engine generating at least one of an upper price bar and a lower price bar, a bottom of the upper price bar being connected to a top of the close price bar above the highest intratime period, and a top of the lower price bar being connected to a bottom of the close price bar below the lowest intratime period; and the charting engine displaying the HLC symbol, which includes the close price bar and the at least one of the upper price bar and the lower price bar, wherein the HLC symbol visually depicts, and enables the user to see, relative to a width of the close bar, respective times when the highest price and the lowest price occurred during the at least a portion of the time period.

9. The method of claim 8, wherein the HLC symbol is a prior HLC symbol and the second intratime period is a prior intratime period, and the method further comprises dynamically generating and displaying a widening HLC symbol after passage of each current intratime period by repetitively erasing the prior HLC symbol and generating and displaying a current HLC symbol from HLC data of the current intratime period, the current HLC symbol having a current close price bar and at least one of a current upper price bar and a lower price bar, wherein a width of the current close price bar is equal to a sum of a width of the current intratime period and each width of all the prior intratime periods.

10. The method of claim 9, further including erasing the current HLC symbol and generating and displaying a final HLC symbol having a final close price bar and at least one of a final upper price bar and a final lower price bar, wherein a width of the final close price bar is equal to a width of the time period.

11. The method of claim 8, further comprising generating the HLC data in real time after each intratime period of the plurality of intratime periods from time/sales data streamed during the intratime period wherein the time/sales data includes a time and a sales price for each trade of one or more trades.

12. The method of claim 8, further comprising generating the HLC data in real time from streaming time/sales data after each change in a last price wherein the time/sales data includes a time and a sales price for each trade of one or more trades.

13. The method of claim 8, wherein the time period is from a fraction of a second to decades.

14. The method of claim 8, wherein the intratime period visually depicts price and time in a one pixel-wide column of one or more pixels.

15. A computer-implemented method for displaying, to a user, an OHLC (open, high, low, close) symbol representative of a price range during at least a portion of a time period including a plurality of intratime periods, the method comprising:

receiving OHLC data of a first intratime period of the plurality of intratime periods and OHLC data of a second intratime period of the plurality of intratime periods;

a charting engine generating an open-close price bar drawn from an open price of the first intratime period to a close price of the second intratime period;

determining a highest intratime period having a highest price from each high price of each of the first and second intratime periods, and determining a lowest intratime period having a lowest price from each low price of each of the first and second intratime periods;

the charting engine generating at least one of an upper price bar and a lower price bar, a bottom of the upper price bar being connected to a top of the open-close price bar above the determined highest intratime period, and a top of the lower price bar being connected to a bottom of the open-close price bar below the determined lowest intratime period; and the charting engine displaying the OHLC symbol including the open-close price bar and the at least one of the upper price bar and the lower price bar, wherein the OHLC symbol visually depicts, and enables the user to see, relative to a width of the open-close bar, respective times when the highest price and the lowest lower price occurred during the at least a portion of the time period.

16. The method of claim 15, wherein the OHLC symbol is a prior OHLC symbol and the second intratime period is a prior intratime period, and the method further comprises dynamically generating and displaying a widening OHLC symbol after passage of each current intratime period by repetitively erasing the prior OHLC symbol, and generating and displaying a current OHLC symbol from current OHLC data of the current intratime period, the current OHLC symbol having a current open-close price bar and at least one of a current upper price bar and a current lower price bar, wherein a width of the current open-close price bar is equal to a sum of a width of the current intratime period and each width of all the prior intratime periods.

17. The method of claim 16, further comprising erasing the current OHLC symbol and generating and displaying a final OHLC symbol having a final open-close price bar and at least one of a final upper price bar and a final lower price bar, wherein a width of the final open-close price bar is equal to a width of the time period.

18. The method of claim 15, further comprising generating the OHLC data in real time after each intratime period of the plurality of intratime periods from time/sales data streamed during the intratime period wherein the time/sales data includes a time and a sales price for each trade of one or more trades.

19. The method of claim 15, further comprising generating the OHLC data in real time from streaming time/sales data after each change in a last price wherein the time/sales data includes a time and a sales price for each trade of one or more trades.

20. The method of claim 15, wherein the time period is from a fraction of a second to decades.

21. The method of claim 15, wherein the intratime period visually depicts price and time in a one pixel-wide column of one or more pixels.

22. A computer-implemented method for displaying, to a user, an OHLC (open, high, low, close) price symbol representative of a price range during a time period, the method comprising:

generating the OHLC price symbol as a quadrilateral, the quadrilateral including a first vertex positioned at a first pair of price-time coordinates of an open price that occurred at a start of the time period, a second vertex positioned at a second pair of price-time coordinates of a high price that occurred at a first time during the time period, a third vertex positioned at a third pair of price-time coordinates of a low price that occurred at a second time during the time period, and a fourth vertex positioned at a fourth pair of price-time coordinates of a close price that occurred at an end of the time period; and, displaying the OHLC price symbol to the user.

23. A computer-implemented method for displaying, to a user, a HLC (high, low, close) price symbol representative of a price range during a time period, the method comprising:

generating the HLC price symbol as a triangle, the triangle including a first vertex positioned at a first pair of price-time coordinates of a high price that occurred at a first time during the time period, a second vertex positioned at a second pair of price-time coordinates of a low price that occurred at a second time during the time period, and a third vertex positioned at a third pair of price-time coordinates of a close price that occurred at an end of the time period; and displaying the HLC price symbol to the user.

24. A non-transitory computer readable storage medium having instructions stored thereon that, upon execution by processing circuitry, cause the processing circuitry to perform a method for displaying, to a user, a candlestick representative of a price range during at least a portion of a time period including a plurality of intratime periods, the method comprising:

receiving OHLC (open, high, low, close) data of a first intratime period of the plurality of intratime periods and OHLC data of a second intratime period of the plurality of intratime periods;

a charting engine generating a candle body from an open price of the first intratime period to a close price of the second intratime period;

determining a highest intratime period having a highest price from each high price of each of the first and second intratime periods, and determining a lowest intratime period having a lowest price from each low price of each of the first and second intratime periods;

the charting engine generating at least one of an upper wick and a lower wick, a bottom of the upper wick being connected to a top of the candle body above the determined highest intratime period, and a top of the lower wick being connected to a bottom of the candle body below the determined lowest intratime period; and the charting engine displaying the candlestick including the candle body and the at least one of the upper wick and lower wick, wherein the candlestick visually depicts, and enables the user to see, relative to a width of the candle body, respective times when the highest price and the lowest price occurred during the at least a portion of the time period.

25. An apparatus for displaying, to a user, a candlestick representative of a price range during at least a portion of a time period including a plurality of intratime periods, the apparatus comprising:

a memory to store computer readable instructions; and processing circuitry configured to execute the computer readable instructions, which cause the processing circuitry to receive OHLC (open, high, low, close) data of a first intratime period of the plurality of intratime periods and OHLC data of a second intratime period of the plurality of intratime periods;

generate a candle body from an open price of the first intratime period and a close price of the second intratime period;

determine a highest intratime period having a highest price from each high price of each of the first and second intratime periods, and determine a lowest intratime period having a lowest price from each low price of each of the first and second intratime periods;

generate at least one of an upper wick and a lower wick, a bottom of the upper wick being connected to a top of the candle body above the determined highest intratime period, and a top of the lower wick being connected to a bottom of the candle body below the determined lowest intratime period; and display the candlestick including the candle body and the at least one of the upper wick and the lower wick, wherein the candlestick visually depicts, and enables the user to see, relative to a width of the candle body, respective times when the highest price and the lowest price occurred during the at least a portion of the time period.

\* \* \* \* \*